(12) United States Patent  
Taniguchi et al.

(10) Patent No.: US 7,174,732 B2  
(45) Date of Patent: Feb. 13, 2007

(54) COOLING CONTROL DEVICE FOR CONDENSER

(75) Inventors: Hiroyoshi Taniguchi, Wako (JP); Makoto Uda, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 174 days.

(21) Appl. No.: 10/953,352

(22) Filed: Sep. 30, 2004

(65) Prior Publication Data

US 2005/0072170 A1   Apr. 7, 2005

(30) Foreign Application Priority Data

Oct. 2, 2003  (JP)  ............. 2003-344492
Oct. 20, 2003  (JP)  ............. 2003-359865

(51) Int. Cl.
*F25B 39/04*  (2006.01)
*F25B 1/06*  (2006.01)
*F01K 7/00*  (2006.01)
*F01K 13/00*  (2006.01)
*F01K 23/06*  (2006.01)

(52) U.S. Cl. ................ 62/183; 62/500; 60/514; 60/515; 60/645; 60/670

(58) Field of Classification Search ........... 60/227, 60/514, 515, 531, 645, 670; 62/181, 183, 62/218, 467, 500, 509
See application file for complete search history.

(56) References Cited

U.S. PATENT DOCUMENTS 4,518,035 A    5/1985  Larinoff 5,000,003 A *  3/1991  Wicks ................. 60/618
5,121,607 A *  6/1992  George, Jr. ........... 60/712
6,751,959 B1 * 6/2004  McClanahan et al. ... 60/670

FOREIGN PATENT DOCUMENTS

| DE | 126 101 A   |   | 6/1977 |
|----|-------------|---|--------|
| JP | 61-159085 A |   | 7/1986 |
| JP | 63-201492 A |   | 8/1988 |
| JP | 04224228 A  | * | 8/1992 |
| JP | 10-185458 A |   | 7/1998 |
| JP | 11-132675 A |   | 5/1999 |
| JP | 2002-115504 A |   | 4/2002 |

* cited by examiner

*Primary Examiner*—Marc Norman
(74) *Attorney, Agent, or Firm*—Birch, Stewart, Kolasch & Birch, LLP

(57) ABSTRACT

Cooling control device for a condenser is provided which includes the condenser, a cooling device for cooling the condenser, and a control device for controlling the cooling device. The cooling device includes a first cooling fan for cooling a gaseous-phase portion of the condenser, and two second cooling fans for cooling a liquid-phase portion of the condenser independently of the first cooling fan. The control device also includes a pressure control section for optimally adjusting a pressure within the gaseous-phase portion, and a temperature control section for optimally adjusting a temperature within the liquid-phase portion. The pressure control section operates the first cooling fan, in accordance with a detected pressure within the gaseous-phase portion, to adjust the pressure within the gaseous-phase portion. The temperature control section operates the second cooling fans, in accordance with a detected temperature within the liquid-phase portion, to adjust the temperature within the liquid-phase portion.

17 Claims, 11 Drawing Sheets

FIG.10
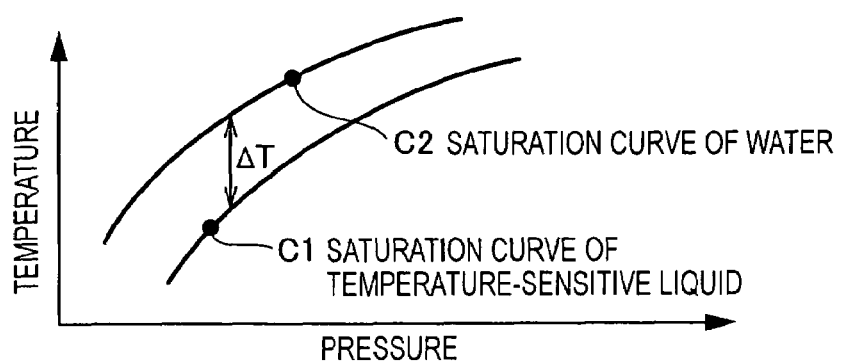
FIG.11A
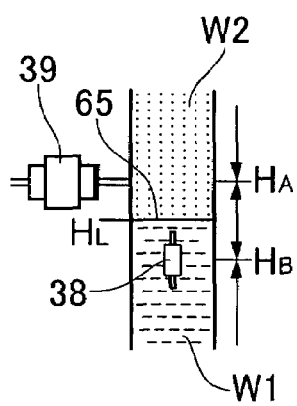
FIG.11B
| LIQUID LEVEL POSITION | AIR VENT | RETURN PUMP |
|---|---|---|
| HIGHER THAN $H_A$ | OPENED | OFF |
| BETWEEN $H_A$ & $H_B$ | CLOSED | OFF |
| LOWER THAN $H_B$ | CLOSED | ON |

COOLING CONTROL DEVICE FOR CONDENSER

This Non-provisional application claims priority under 35 U.S.C. § 119(a) on Patent Application No(s). 2003-344492 and 2003-359865 filed in Japan on Oct. 2, 2003 and Oct. 20, 2003 respectively, the entire contents of which are hereby incorporated by reference.

FIELD OF THE INVENTION

The present invention relates generally to cooling control devices for condensers. More particularly, the present invention relates to an improved cooling control device which is applied to a condenser in a Rankine cycle apparatus that is used, for example, as a vehicle-mounted apparatus for converting exhaust heat energy of a vehicle-mounted engine into mechanical energy, and which controls a pressure within the condenser and temperature of condensed water within the condenser independently of each other.

BACKGROUND OF THE INVENTION

Rankine cycle apparatus have been known as systems for converting heat energy into mechanical work. The Rankine cycle apparatus include a structure for circulating water in the liquid and gaseous phases within a sealed piping system forming a circulation system in the apparatus. Generally, the Rankine cycle apparatus include a water supplying pump unit, an evaporator, an expander, a condenser, and pipes connecting between these components to provide circulation circuitry.

FIG. 18 hereof is a schematic block diagram of a general setup of a conventionally-known Rankine cycle apparatus (e.g., vehicle-mounted Rankine cycle apparatus) and certain details of a condenser employed in the Rankine cycle apparatus. The Rankine cycle apparatus of FIG. 18 includes a water supplying pump unit 110, an evaporator 111, an expander 107, and the condenser 100. These components 110, 111, 107 and 100 are connected via pipes 108 and 115, to provide circulation circuitry in the apparatus.

Water (liquid-phase working medium), which is supplied, a predetermined amount per minute, by the water supplying pump unit 110 via the pipe 115, is imparted with heat by the evaporator 111 to turn into water vapor (gaseous-phase working medium). The vapor is delivered through the next pipe 115 to the expander 107 that expands the water vapor. Mechanical device (not shown) is driven through the vapor expansion by the expander 107 so as to perform desired mechanical work.

Then, the expansion of the water vapor is terminated by lowering the temperature and pressure of the vapor and the resultant water vapor of the lowered temperature and pressure is delivered through the pipe 108 to the condenser 100, where the vapor is converted from the vapor phase back to the water phase. After that, the water is returned through the pipe 115 to the water supplying pump unit 110, from which the water is supplied again for repetition of the above actions. The evaporator 111 is constructed to receive heat from an exhaust pipe extending from the exhaust port of the engine of the vehicle.

The following paragraphs detail a structure and behavior of the condenser 100 in the conventional vehicle-mounted Rankine cycle apparatus shown in FIG. 18.

The condenser 100 includes a vapor introducing chamber 101, a water collecting chamber 102, and a multiplicity of cooling pipes 103 vertically interconnecting the two chambers 101 and 102. In the figure, only one of the cooling pipes 103 is shown in an exaggerative manner. Substantial upper half of the interior of each of the cooling pipes 103 is a vapor (gaseous-phase) portion 104, while a substantial lower half of the interior of the cooling pipe 103 is a water (liquid-phase) portion 105. In the vapor portion 104, most of the working medium introduced via the vapor introducing chamber 101 to the cooling pipe 103 is in the gaseous phase, while, in the water portion 105, most of the working medium flowing through the cooling pipe 103 is kept in the liquid (condensed water) phase. Boundary between the vapor 104 and the water 105 (i.e., gas-liquid interface) is a liquid level position 112.

One cooling fan 106 is disposed behind the cooling pipes 103 (to the right of the cooling pipes 103 in FIG. 18). The cooling fan 106 is surrounded by a cylindrical shroud 106a. Normally, operation of the cooling fan 106 is controlled by an electronic control unit on the basis of a water temperature at an outlet port of the condenser 100. The single cooling fan 106 sends air to the entire region, from top to bottom, of all of the cooling pipes 103 to simultaneously cool the cooling pipes 103.

The condenser 100 operates as follows during operation of the Rankine cycle apparatus. Water vapor of a relatively low temperature, discharged from the expander 107 with a reduced temperature and pressure, is sent into the vapor introducing chamber 101 of the condenser 100 via the low-pressure vapor pipe 108 and then directed into the cooling pipes 103. Cooling air 109 drawn into the cooling fan 106 is sent to the condenser 100.

Strong cooling air is applied by the cooling fan 106 to the upstream vapor portion 104 of the condenser 100, i.e. a portion of each of the cooling pipes 103 where a mixture of the vapor and water exists, and thus latent heat emitted when the vapor liquefies can be recovered effectively by the cooling air. Cooling air is also applied by the cooling fan 106 to the downstream water portion 105 of the condenser 100, i.e. a portion of each of the cooling pipes 103 where substantially only the water exists. Water condensed within the cooling pipes 103 of the condenser 100, is collected into the water collecting chamber 102 and then supplied by the water supplying pump unit 110 to the evaporator 111 in a pressurized condition as noted above.

In FIG. 18, reference numeral 116 represents a surface area of a condensing heat transmission portion, and 117 represents a surface area of a heat transmission portion of the condensed water. The surface areas 116 and 117 of the heat transmission portions and the liquid level position 112 have the following relationship.

The conventional Rankine cycle apparatus 100 inherently has the characteristic that the liquid fluid position 112 varies. Namely, because the engine output varies in response to traveling start/stop and transient traveling velocity variation of the vehicle, the amount of water supply to the evaporator 111 also varies, in response to which the liquid level position 112 within the condenser 100 varies. Namely, in the condenser 100, the liquid level position 112 rises when the amount of the vapor flowing into the condenser 100 (i.e., inflow amount of the vapor) is greater than the amount of the condensed water discharged from the condenser 100 (i.e., discharge amount of the condensed water), but lowers when the inflow amount of the vapor is smaller than the discharge amount of the condensed water. In this way, the vapor-occupied portion (104) in the cooling pipes 103 of the condenser 100 increases or decreases. Because the condensed water (in the portion 105) is discharged from the water supplying pump unit 110 subjected to predetermined flow rate control, a pressure from an outlet port 113 of the expander 107 to an inlet port 114 of the water supplying pump unit 110 is determined by a pressure within the condenser 100. The pressure within the condenser 100 is determined by an amount of condensing heat exchange caused by cooling of the vapor portion (104) of the condenser, and the amount of condensing heat exchange is determined by a flow rate of the medium to be cooled and a surface area of the condensing heat transmission portion 116. Thus, if the portion occupied with the vapor increases or decreases due to variation (rise or fall) of the liquid level position 112, the surface area 116 of the condensing heat transmission portion increases or decreases and so the pressure within the condenser 100 and the flow rate of the medium to be cooled do not uniformly correspond to each other any longer.

Similarly, the temperature of the condensed water at the outlet port of the condenser 100 is determined by an amount of heat exchange caused by cooling of the water portion (105) of the condenser, and the amount of the heat exchange of the condensed water is determined by the flow rate of the medium to be cooled and a surface area 117 of a heat transmission portion of the condensed water. Thus, if the portion occupied with the condensed water (105) increases or decreases due to variation (rise or fall) of the liquid level position 112, the surface area 117 of the heat transmission of the condensed water portion increases or decreases and so the temperature of the condensed water and the flow rate of the medium to be cooled do not uniformly correspond to each other any longer.

As noted above, the conventional condenser 100 is cooled in its entirety by means of the single cooling fan 106; that is, the gaseous-phase (vapor) portion 104 and the liquid-phase (water) portion 105 are cooled simultaneously by the same cooling fan 106. Therefore, although either one of the pressure within the condenser and the condensed water temperature can be controlled to agree with a target setting, both of the pressure within the condenser and the condensed water temperature can be controlled to agree with their respective target settings. Namely, if operation is performed by a human operator to control the pressure within the condenser through adjustment of the number of rotations of the cooling fan 106, the heat exchange amount in regions of the cooling pipes (condensed water cooling regions) where the water 105 exists also varies, so that the water 105 varies in temperature; thus, in this case, the condensed water temperature can not be controlled as desired. Conversely, if operation is performed to control the temperature of water (condensed water) 105 through adjustment of the number of rotations of the cooling fan 106, the heat exchange amount in regions of the cooling pipes (condensing regions) where the water vapor 104 exists also varies, so that the pressure within the condenser varies; thus, in this case, the pressure within the condenser can not be controlled as desired.

In the case where the condensed water temperature can not be controlled, and if the condensed water temperature increases, cavitations (bubbles) would be produced in the water supplying pump unit 110 located downstream of the condenser 100, which would result in deterioration in the pumping function of the pump unit 110. Conversely, if the condensed water temperature decreases, extra heat energy has to be consumed for subsequent re-heating of the water in the evaporator 111.

Also, in the case where the pressure within the condenser 100 can not be controlled as noted above, an increase in the pressure within the condenser 100 would lead to a decrease or decline in the output of the expander 107. Further, a decrease in the pressure within the condenser 100 would also produce cavitations (bubbles) in the downstream water supplying pump unit 110, which would result in deterioration in the pumping function of the pump unit 110.

Examples of the conventional condensers provided with a plurality of cooling fans are disclosed in Japanese Patent Laid-Open Publication Nos. 2002-115504 and SHO-63-201492.

Namely, the Rankine cycle apparatus disclosed in the 2002-115504 publication includes a separate cooling fan for each of the gaseous-phase and liquid-phase portions of the condenser so that the gaseous-phase and liquid-phase portions are cooled separately by the respective cooling fans. The 2002-115504 publication also discloses controlling the operation of the cooling fan for the liquid-phase portion on the basis of a detected temperature of water at an outlet port of the condenser.

Further, the SHO-63-201492 publication discloses a method for controlling a high-pressure condenser which includes two air blowers for cooling corresponding portions of the condenser. Depending on the situation, either or both of the air blowers are driven so as to control a total amount of cooling air supply to the condenser. Namely, the air-cooled high-pressure condenser includes the two air blowers and a condensed-water outlet adjusting valve, etc., and the pressure within the condenser is controlled with a pressure greater than the atmospheric pressure and the temperature of the condensed water is supercooled to 100° C. or below. Specifically, in the disclosed air-cooled high-pressure condenser, the pressure within the condenser is controlled through adjustment of the total amount of cooling air supply by changing the number of the air blower to be driven. Namely, the SHO-63-201492 publication never teaches providing two air blowers in corresponding relation to the gaseous-phase and liquid-phase portions and controlling the two air blowers independently of each other.

Further, a high-pressure condenser control device disclosed in Japanese Patent Laid-Open Publication No. HEI-10-185458 includes a first control that compares a difference between gaseous-phase and liquid-phase pressures within the condenser with a predetermined condenser water level setting and controls a condensed-water outlet adjusting valve so that the pressure difference becomes constant, and a second control that compares a gaseous-phase pressure within the condenser with a predetermined pressure setting and controls a single condenser cooling fan in such a manner that the gaseous-phase pressure becomes constant. Because only one condenser cooling fan is provided here, the disclosed control device presents a problem with the cooling arrangements as explained above in relation to FIG. 18.

Further, in the conventionally-known freezing machines, for example, there is also provided a condenser in a circulation system that circulates a working medium in liquid and gaseous phases. As illustrated in FIG. 19, the circulation system includes the condenser 301, expansion valve 302, heat exchanger (evaporator) 303 and compressor 304. In the conventionally-known freezing machines, the condenser 301, which communicates with the compressor 304 located upstream thereof, cools the gaseous-phase working medium supplied from the compressor 304 to thereby convert the gaseous-phase working medium into the liquid-phase working medium. Here, if a pressure increase occurs in the gaseous-phase portion of the condenser 301, the compressor 304 has to be driven in conformity with the pressure increase, which results in an increased workload. The extra workload can be avoided by performing optimal pressure control corresponding to a detected pressure within the condenser 301.

Also, the condenser 301 communicates at its downstream end with the expansion valve 302 located downstream thereof, and a supercooled liquid-phase working medium is supplied from the liquid-phase portion of the condenser 301 to the expansion valve 302. Variation in the intensity of the supercooling (i.e., variation in the temperature) would undesirably lower the cooling capability of the heat exchanger (evaporator) 303 communicating with the downstream end of the expansion valve 302. By performing temperature control corresponding to a detected temperature, it is possible to prevent the lowering of the cooling capability due to variation in the intensity of the optimized supercooling of the liquid-phase working medium and thereby secure a desired cooling capability. For the condenser 310 of the freezing machine too, independent optimal temperature control is required for each of the gaseous-phase and liquid-phase portions. For that purpose, it is desirable that the gaseous-phase and liquid-phase portions of the condenser 310 of the freezing machine be demarcated as separate objects of cooling control and cooled by respective sets of cooling elements (cooling fans, cooling water, etc.) while being controlled independently of each other. It is further desirable that physical objects to be controlled in the gaseous-phase and liquid-phase portions be set separately so that efficient cooling can be done in each of the gaseous-phase and liquid-phase portions.

Specifically, in the Rankine cycle apparatus, it is desirable that control be performed to retain an optimal pressure in the gaseous-phase portion of the condenser because the pressure in the gaseous-phase portion has great influences on various operations of the upstream expander and down-stream water supplying pump. If the pressure in the gaseous-phase portion is too high, the output of the expander would decline, while, if the pressure in the gaseous-phase portion is too low, cavitations would be produced in the water supplying pump. Thus, it is desirable to perform optimal control to avoid these inconveniences.

Also, control is performed to retain an optimal temperature in the liquid-phase portion of the condenser because the temperature in the liquid-phase portion has great influences on the behavior of the downstream water supplying pump. For example, if the temperature in the liquid-phase portion is too high, cavitations would be produced, and it is desirable to perform optimal control to avoid the inconvenience. Further, in the freezing machines, it is desirable that optimal pressure control corresponding to a detected pressure in the gaseous-phase portion of the condenser be performed on the gaseous-phase portion to avoid an extra workload and that optimal temperature control corresponding to a detected temperature in the liquid-phase portion of the condenser be performed in the liquid-phase portion to secure a desire cooling capability.

Namely, there has been a great demand for a novel technique which can cool the gaseous-phase and liquid-phase portions of the condenser independently of each other in accordance with respective criteria (pressure and temperature criteria) and efficiently on the basis of information indicative of the detected pressure within the condenser and detected temperature of the condensed water at the outlet port of the condenser in such a manner that the pressure within the condenser and temperature of the condensed water at the outlet port become optimal, and which can perform appropriate cooling control on the gaseous-phase and liquid-phase portions independently of each other.

SUMMARY OF THE INVENTION

According to one aspect of the present invention, there is provided a cooling control device for a condenser, which comprises: the condenser for converting a gaseous-phase working medium, discharged from an expander, back to a liquid-phase working medium; a supply pump for supplying the liquid-phase working medium, discharged from the condenser, to an evaporator in a pressurized condition; a first cooling section for cooling a gaseous-phase portion of the condenser; a second cooling section for cooling a liquid-phase portion of the condenser; a pressure control section for adjusting a pressure within the gaseous-phase portion by driving the first cooling section in accordance with a detected pressure within the gaseous-phase portion; and a temperature control section for adjusting a temperature within the liquid-phase portion by driving the second cooling section in accordance with a detected temperature within the liquid-phase portion.

With such arrangements of the cooling control device of the present invention, the vapor pressure of the gaseous-phase portion and the condensed water temperature of the liquid-phase portion in the condenser can be controlled to be optimal independently of each other. By thus optimally adjusting the gaseous-phase portion of the condenser, it is possible to prevent a decline of the output of the expander. Further, by optimally adjusting the liquid-phase portion, it is possible to suppress production of cavitations in a high-pressure water supplying pump located downstream of the condenser.

Namely, in the present invention where separate cooling sections are provided for independently cooling the gaseous-phase portion and liquid-phase portion, located upstream and downstream of the gas-liquid interface of the condenser, the cooling section dedicated to the gaseous-phase section functions to enhance the cooling efficiency of the gaseous-phase portion in accordance with a detected gaseous-phase pressure of the condenser, while the cooling section dedicated to the liquid-phase section functions to enhance the cooling efficiency of the liquid-phase portion in accordance with a detected liquid-phase pressure of the condenser. The cooling control of the gaseous-phase section prevents a decline in the output of the expander, permits high-efficiency operation of the expander, prevents the pump cavitations, reduces the heat energy loss, and permits stabilized operation of the pump. Further, the cooling control of the liquid-phase section prevents the pump cavitations, reduces the heat energy loss, and permits stabilized operation of the pump.

The terms "decline in the output of the expander", "pump cavitations" and "heat energy loss" are used herein to mean the following.

The terms "decline in the output of the expander" mean that, as the pressure within the condenser gets higher than the discharge pressure of the expander, the working medium flows backward toward the expander and the output of the expander declines due to the higher pressure of the condenser.

The terms "pump cavitations" mean that, as the pressure of the condenser decreases, the boiling temperature of the condensed water lowers and thus the possibility of cavitations being produced increases. Further, as the condensed water temperature increases to approach its boiling temperature, more cavitations can be produced. Therefore, in order to minimize the heat energy loss, it is desirable to achieve a condenser temperature and pressure that would cause no undesired cavitation, while keeping the condensed water temperature as high as possible. If such pump cavitations are produced, the high-pressure water supplying would present deterioration in its pumping function.

The terms "heat energy loss" means that, if the condensed water temperature drops excessively, extra heat energy corresponding to the temperature drop is required for reheating by the evaporator and hence results in a heat energy loss.

As noted above, the cooling control device of the present invention is characterized by providing separate cooling sections (e.g., cooling fans) for the gaseous-phase and liquid-phase portions and causing the cooling sections to perform respective air-sending/cooling operations on the basis of separate or independent control, i.e. pressure control on the gaseous-phase portion and temperature control on the liquid-phase portion. As a result, the present invention can control each of the gaseous-phase and liquid-phase portions with optimal cooling efficiency.

Preferably, the pressure control section controls the first cooling section so that the pressure of the gaseous-phase portion is kept lower than the pressure of the gaseous-phase working medium discharged from the expander. In this way, the present invention can reliably prevent the decline in the output of the expander.

Further, preferably, the pressure control section controls the first cooling section so that the pressure of the gaseous-phase portion is kept higher than a pump-cavitation producing pressure of the liquid-phase working medium. In this way, the present invention can reliably prevent the pump cavitations.

It is also preferable that the temperature control section control the second cooling section so that the temperature of the liquid-phase portion is kept lower than a pump-cavitation producing temperature of the liquid-phase working medium. In this way, it is possible to reliably prevent the pump cavitations, optimize the liquid-phase temperature, prevent excessive super-cooling and minimize the heat energy loss.

Further, preferably, the temperature control section controls at least the temperature of the discharged liquid-phase working medium near the outlet port of the condenser, as the temperature of the liquid-phase portion to be adjusted. In this way, it is possible to prevent the pump cavitations and excessive supercooling and minimize the heat energy loss. Because the temperature of the discharged liquid-phase working medium near the outlet port of the condenser, which most closely represents an actual value of the temperature of the liquid-phase working medium having been just condensed by the cooling section, the cooling efficiency of the cooling section can be controlled with good response, so that an optimal liquid-phase temperature can be retained in a stable manner.

According to another aspect of the present invention, there is provided a cooling control device for a condenser in a Rankine cycle apparatus, which comprises: an evaporator for heating a liquid-phase working medium to produce a gaseous-phase working medium; an expander for converting heat energy of the gaseous-phase working medium, discharged from the evaporator, into mechanical energy; the condenser for cooling the gaseous-phase working medium, discharged from the expander, to convert the gaseous-phase working medium back to the liquid-phase working medium; a supply pump for supplying the liquid-phase working medium, discharged from the condenser, to the evaporator in a pressurized condition; a first cooling section for cooling a gaseous-phase portion of the condenser; a second cooling section for cooling a liquid-phase portion of the condenser, the second cooling section being operable independently of the first cooling section; a pressure control section for adjusting a cooling efficiency of the gaseous-phase portion by driving the first cooling section in accordance with a detected pressure of the gaseous-phase portion, to thereby adjust the pressure within the gaseous-phase portion; and a temperature control section for adjusting a cooling efficiency of the liquid-phase portion by driving the second cooling section in accordance with a detected temperature of the liquid-phase portion, to thereby adjust the pressure within the liquid-phase portion.

According to still another aspect of the present invention, there is provided a control device for a cooling device for cooling a condenser that converts a gaseous-phase working medium back to a liquid-phase working medium, which comprises: a first cooling section for cooling a gaseous-phase portion of the condenser; a second cooling section for cooling a liquid-phase portion of the condenser; a pressure control section for adjusting a pressure within the gaseous-phase portion by driving the first cooling section in accordance with a detected pressure of the gaseous-phase portion; and a temperature control section for adjusting a temperature within the liquid-phase portion by driving the second cooling section in accordance with a detected temperature of the liquid-phase portion.

Preferably, in the control device, an expander for converting heat energy into mechanical energy is provided upstream of the condenser, and a supply pump is provided downstream of the condenser for supplying the liquid-phase working medium, discharged from the condenser, to a succeeding stage in a pressurized condition. In this case, the condenser is included, for example, in a Rankine cycle apparatus, and the inventive arrangements can prevent the decline in the output of the expander by controlling the gaseous-phase portion to assume an optimal temperature. Also, production of cavitations in the downstream high-pressure water supplying pump can be prevented by controlling the liquid-phase portion to assume an optimal temperature.

Further, it is preferable that, in the control device, a compressor for discharging the gaseous-phase working medium be provided upstream of the condenser and an expansion valve for converting the liquid-phase working medium, discharged from the condenser, to the gaseous-phase working medium be provided downstream of the condenser. In this case, the condenser is included, for example, in a freezing machine, and the inventive arrangements can avoid an extra workload of the compressor by controlling the gaseous-phase portion to assume an optimal pressure. Further, it is possible to prevent deterioration in the cooling capability due to variation in optimized super-cooling intensity of the liquid-phase working medium, by controlling the liquid-phase portion to assume an optimal temperature.

BRIEF DESCRIPTION OF THE DRAWINGS

Certain preferred embodiments of the present invention will hereinafter be described in detail, by way of example only, with reference to the accompanying drawings, in which:

FIG. 10 is a graph showing respective saturation curves of a temperature-sensitive liquid and water;

FIGS. 11A and 11B are a view and table explanatory of details of liquid level position settings;

DETAILED DESCRIPTION OF THE PREFERRED EMBODIMENTS

Figure 1:
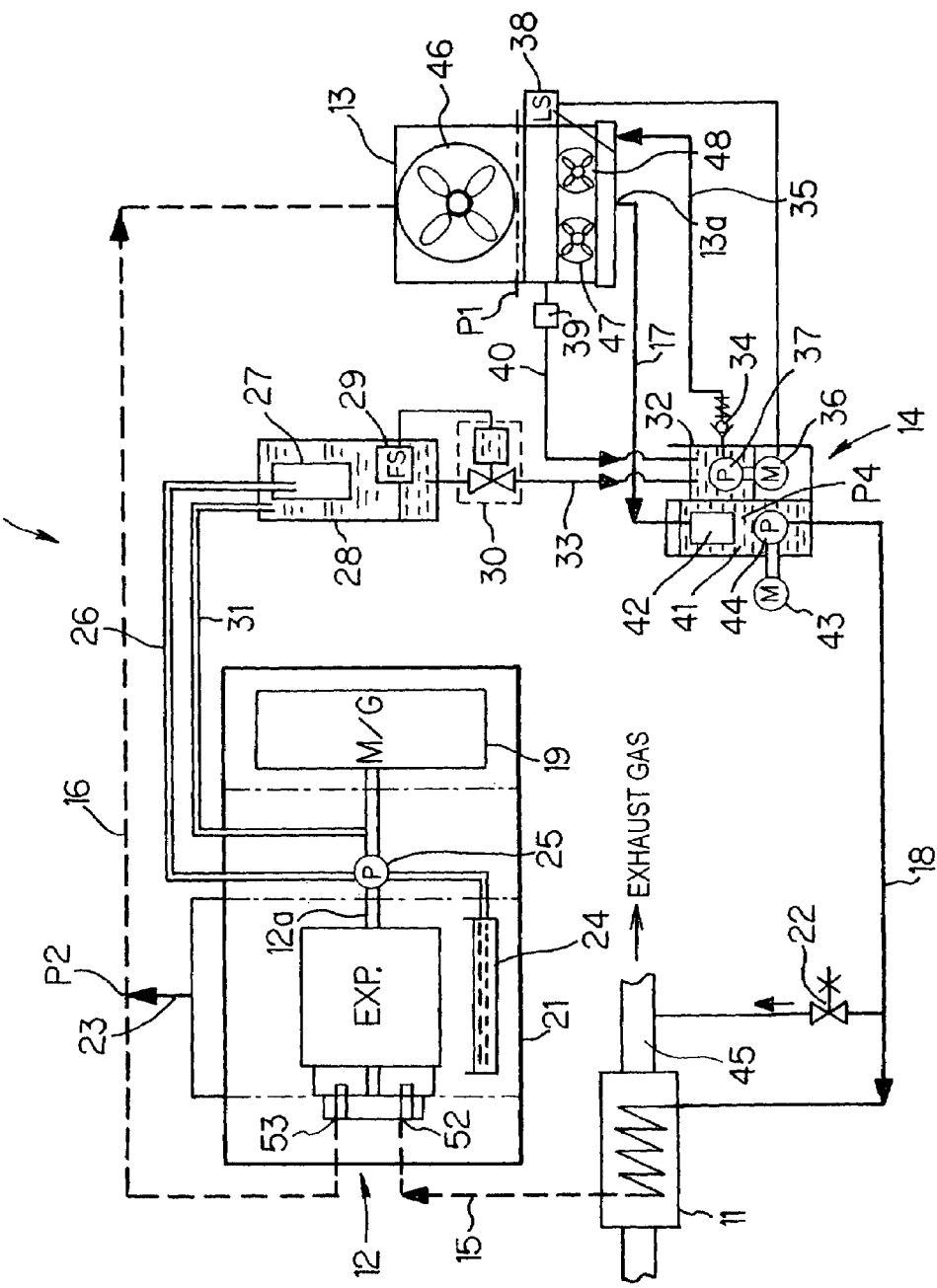
FIG. 1 is a block diagram showing a general system setup of a Rankine cycle apparatus in accordance with an embodiment of the present invention.

First, a description will be made about an example general setup of a Rankine cycle apparatus in accordance with an embodiment of the present invention, with reference to FIG. 1.

The Rankine cycle apparatus 10 includes an evaporator 11, an expander 12, a condenser 13, and a water supplying pump unit 14 provided with a supply pump.

The evaporator 11 and the expander 12 are interconnected via a pipe 15, and the expander 12 and the condenser 13 are interconnected via a pipe 16. Further, the condenser 13 and the water supplying pump unit 14 are interconnected via a pipe 17, and the water supplying pump unit 14 and the evaporator 11 are interconnected via a pipe 18. With such a piping structure, there is formed closed circulation circuitry (circulation system) through which a working medium is circulated within the Rankine cycle apparatus 10 in the gaseous or liquid phase. The working medium in the Rankine cycle apparatus 10 is in water (liquid) and water vapor (gaseous) phases.

The circulation circuitry of the Rankine cycle apparatus 10 has a circulating structure hermetically sealed from the outside, which allows water or vapor to circulate therethrough.

In the circulation circuitry of the Rankine cycle apparatus 10, the water (liquid-phase medium) travels from a liquid level position, indicated by a broken line P1, within the condenser 13, through the water supplying pump unit 14, to the evaporator 11. In FIG. 1, the pipes 17 and 18, through which the water travels, are indicated by thick solid lines. The vapor (gaseous-phase medium) travels from the evaporator 11, through the expander 12, to the liquid level position P1 within the condenser 13. The pipes 15 and 16, through which the vapor travels, are indicated by thick broken lines.

The Rankine cycle apparatus 10 is constructed to phase-convert water into water vapor using heat from a heat source, and produce mechanical work using expansion of the water vapor. The evaporator 11 is a mechanism for converting water into vapor.

As will be later described in detail, the Rankine cycle apparatus 10 is constructed as a vehicle-mounted apparatus suitable for mounting on an automotive vehicle. For that purpose, the evaporator 11 uses heat of exhaust gas from the vehicle engine as the heat source. Namely, the evaporator 11 uses heat of the exhaust gas, flowing through an exhaust pipe 45 of the engine (internal combustion engine), to heat and superheat water supplied from the water supplying pump unit 14, so as to produce high-temperature and high-pressure water vapor. The high-temperature and high-pressure water vapor produced by the evaporator 11 is supplied to the expander 12.

Needless to say, the evaporator 11 may use higher-temperature exhaust gas from an exhaust port, exhaust manifold (not shown) or the like located downstream of an exhaust valve of the engine, rather than from the exhaust pipe 45.

The expander 12 has an output shaft 12a connected to the rotor (not shown) or the like of a motor/generator (M/G) 19 so as to allow the motor/generator (M/G) 19 to operate as a generator. The expander 12 is constructed to expand the high-temperature and high-pressure water vapor supplied from the evaporator 11 and rotates the output shaft 12a through the expansion of the vapor. The rotation of the output shaft 12a rotates the rotor of the motor/generator 19 to cause the motor/generator 19 to make predetermined mechanical rotation or perform predetermined power generation operation. The output shaft 12a of the expander 12 is also connected to a hydraulic pump 25 to drive the pump 25.

As noted above, the expander 12 produces mechanical work through the expansion of the high-temperature and high-pressure water vapor supplied from the evaporator 11 via the pipe 15 and thereby drives various loads, such as the motor/generator 19 and hydraulic pump 25. The vapor 12 discharged from the evaporator 12 decreases in temperature and pressure and is delivered via the pipe 16 to the condenser 13 with the decreased temperature and pressure.

The condenser 13 cools and liquefies the vapor delivered from the evaporator 12. Water produced through the liquefaction by the condenser 13 (i.e., condensed water) is returned via the pipe 17 to the water supplying pump unit 14.

High-pressure pump 44 of the water supplying pump unit 14 pressurizes the water liquefied by the condenser 13 (i.e., condensed water from the condenser 13) and re-supplies or replenishes the pressurized condensed water to the evaporator 11.

The Rankine cycle apparatus 10 having the above-described general system setup includes the following as other relevant components.

In a portion of the pipe 18 near the evaporator 11, there is provided a pressure relief valve 22 for adjusting a pressure within the pipe 18 in response to pressure variation within the pipe 18.

Within a casing 21 of the expander 12, there is provided a breather (separator) 23 for returning leaked water vapor to the pipe 16. Further, within the casing 21, an oil pan 24 is disposed under the expander 12. Oil built up in the oil pan 24 with water mixed therein is delivered by the hydraulic pump 25 to an oil coalescer 27 via a pipe 26.

The oil and water are separated from each other by the oil coalescer 27, and the separated water is stored in a lower portion of an oil tank 28 due to a difference in specific gravity. Valve mechanism 30 operating on the basis of a float sensor 29 is mounted in the oil tank 28.

The oil separated from the water by the oil coalescer 27 and stored in an upper portion of the oil tank 28 is supplied, through a pipe 31, to various sections of the expander 12 by way of an oil path (not shown) formed in the output shaft 12a.

The water stored in the lower portion of the oil tank 28 is supplied, via a pipe 33, to an open tank 32 of the water supplying pump unit 14 through operation of the valve mechanism 30.

The open tank 32 of the water supplying pump unit 14 and the condenser 13 are interconnected by a pipe 35 via a water supplying return pump 37 and check valve 34.

The condenser 13 includes a liquid level sensor 38 and air vent 39 provided near the liquid level position. Water supply from the open tank 32 to the condenser 13 is performed by the water supplying return pump 37 that is driven by a motor 36 turned on/off in response to a signal from the liquid level sensor 38. Further, the open tank 32 and the condenser 13 are interconnected by a pipe 40 that discharges the water via the air vent 39.

The pipe 17 for returning the condensed water discharged from the condenser 13 is connected to a water coalescer 42 within a sealed tank 41 of the pump unit 14. Water in the sealed tank 41 is supplied, by the high-pressure water supplying pump 44 driven by a motor 43, to the evaporator 11 via the pipe 18.

Further, in association with the condenser 13, there are provided a plurality of cooling fans 46–48 for generating cooling air independently for different portions of the condenser 13.

In the above-described arrangements, a working medium supply device is constituted by elements pertaining to the liquid level position within the condenser 13 and lower section of the condenser 13 and by the water supplying pump unit 14.

In a closed working medium circulation system of the Rankine cycle apparatus 10, a working medium leaked from the breather 23 of the expander 12 is returned via an outlet port P2 to the pipe 16 of the circulation system.

Figure 2:
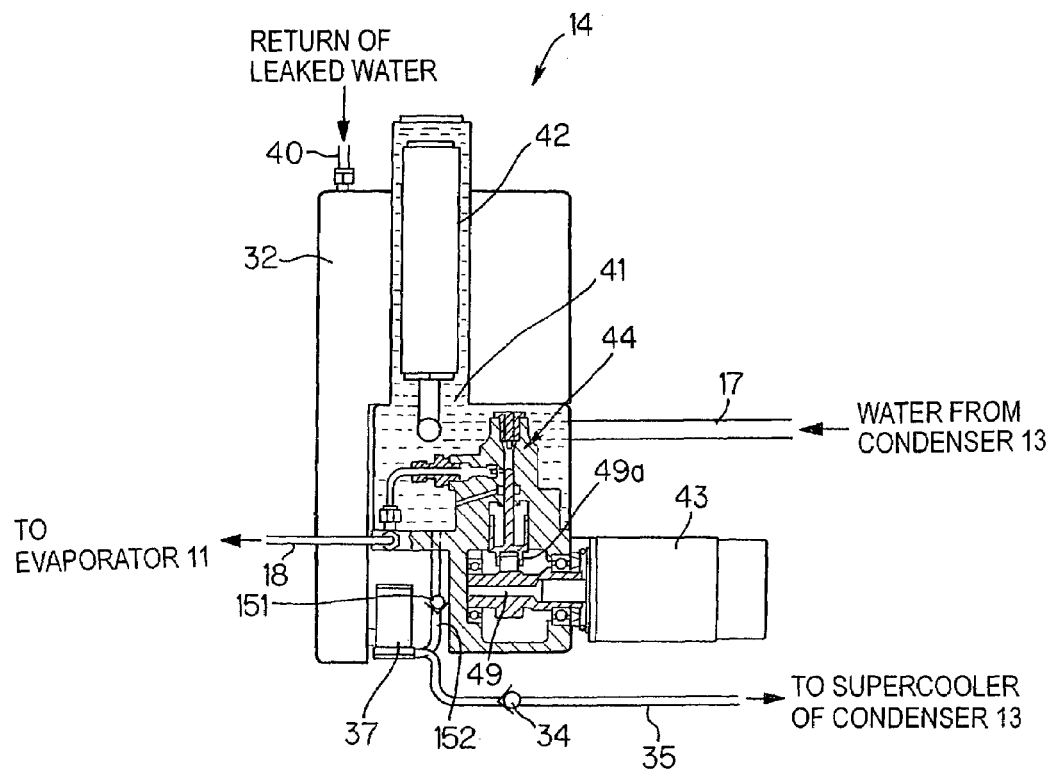
FIG. 2 is a sectional view illustrating an inner structure of a water supplying pump unit of FIG. 1.

FIG. 2 is a view showing an example specific structure of the water supplying pump unit 14.

The water supplying pump unit 14 comprises the water coalescer 42, sealed tank 41, high-pressure water supplying pump 44 driven by the drive motor 43, open tank 32, return pump 37, and check valve 34.

Although a rotation shaft 49 of the drive motor 43 is shown in the figure as being parallel to the surface of the sheet of the drawing, this is just for convenience of illustration; in practice, the rotation shaft 49 is disposed perpendicularly to the sheet of the drawing. The rotation shaft 49 of the drive motor 43 is held in engagement with a cam mechanism 49a, so as to function as a cam shaft.

The water coalescer 42 separates oil and water, and the sealed tank 41 directly collects leaked water from the high-pressure water supplying pump 44. The high-pressure water supplying pump 44 supplies a required amount of water by performing water amount control based on the number of pump rotations.

The open tank 32 is provided for temporarily storing water leaked out of the circulation circuitry. The return pump 37 returns the leaked water to the sealed tank 41 or to a supercooler of the condenser 13. Namely, the return pump 37 returns the leaked water from the open tank 32 to the closed tank 41 through a pipe 152 equipped with a check valve 151, or delivers the water to the supercooler of the condenser 13 through the pipe 35 equipped with the check valve 34 as necessary. The check valve 151 of the pipe 152 prevents a reverse flow of the water from the sealed tank 41, and the check valve 34 of the pipe 35 prevents a reverse flow of the water from the supercooler of the condenser 13.

Water discharged from the outlet port 13a (see FIG. 1) of the condenser 13 is passed through the water coalescer 42 via the pipe 17 so that the water is separated from oil and only the water is fed to the high-pressure water supplying pump 44 driven by the drive motor 43. The high-pressure water supplying pump 44 delivers the water to the evaporator 11 via the pipe 18. Leaked water is returned via the pipe 40 to the open tank 32.

Figure 3:
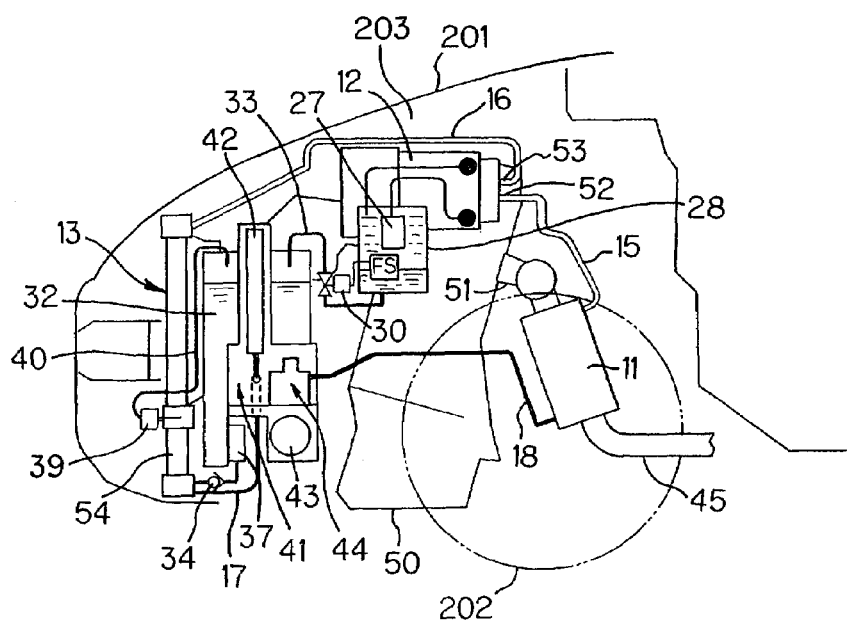
FIG. 3 is a view of example layout of various components of the Rankine cycle apparatus of FIG. 1 when mounted on a vehicle.

The following paragraphs describe the Rankin cycle apparatus 10 mounted on the vehicle, with reference to FIG. 3.

Reference numeral 201 indicates a front body of the vehicle, and 202 a front road wheel. Engine room 203 is formed within the front body 201, and the engine 50 is mounted in the engine room 203. The exhaust manifold 51 is provided on a rear surface of the engine 50, and the above-mentioned exhaust pipe 45 is connected to the exhaust manifold 51.

The evaporator 11 is mounted on a portion of the exhaust pipe 45 near the exhaust manifold 51. The pipe 18 extending from the high-pressure water supplying pump 44 is coupled to the evaporator 11, and the pipe 18 supplies water to the evaporator 11 using, as its heat source, the heat of exhaust gas from the high-pressure water supplying pump 44. The evaporator 11 phase-converts the water into water vapor using the heat of the exhaust gas and supplies the converted vapor to the expander 12 via the pipe 15 connected to a vapor inlet port 52 of the expander 12. The expander 12 converts expansion energy of the water vapor into mechanical energy.

The expander 12 has a vapor outlet port 53 connected to the pipe 16, and the condenser 13 for cooling/condensing water vapor into water is disposed between the pipe 16 and the sealed tank 41 leading to an inlet side of the high-pressure water supplying pump 44. The condenser 13 is located in a front area of the engine room 203. In FIG. 3, there is also shown a layout of the open tank 32, water coalescer 42, return pump 37, oil coalescer 27, super cooler 54 (liquid-phase portion of the condenser 13), air vent 39, check valve 34, etc. As note above, the high-pressure water supplying pump 44, evaporator 11, expander 12, condenser 13, etc. together constitute the Rankine cycle apparatus for converting heat energy into mechanical energy.

Behavior of the Rankine cycle apparatus is explained below in order that corresponds to flows of water and water vapor within the Rankine cycle apparatus.

Water cooled and condensed in the condenser 13 is supplied, in a pressurized condition, by the high-pressure water supplying pump 44 to the evaporator 11 via the pipe 18.

The water, which is a liquid-phase working medium, is heated by the evaporator 11 imparting the water with heat energy until it becomes high-temperature and high-pressure water vapor, and the resultant high-temperature and high-pressure water vapor is supplied to the expander 12. The expander 12 converts the heat energy into mechanical energy through expanding action of the high-temperature and high-pressure water vapor, and the mechanical energy is supplied to the motor/generator 19 annexed to the expander 12.

The water vapor let out from the expander 12 assumes a lowered temperature and pressure, which is then delivered to the condenser 13. The water vapor of lowered temperature and pressure delivered to the condenser 13 is again cooled and condensed in the condenser 13, and the resultant condensed water is supplied via the water coalescer 42 to the high-pressure water supplying pump 44. After that, the water, which is a liquid-phase working medium, repeats the above circulation, so that the expander 12 continues to be supplied with water vapor of high temperature and pressure.

Next, a description will be made about control of the liquid level position of water accumulated in the condenser 13 of the Rankine cycle apparatus 10, with reference to FIGS. 4–13.

Figure 4:
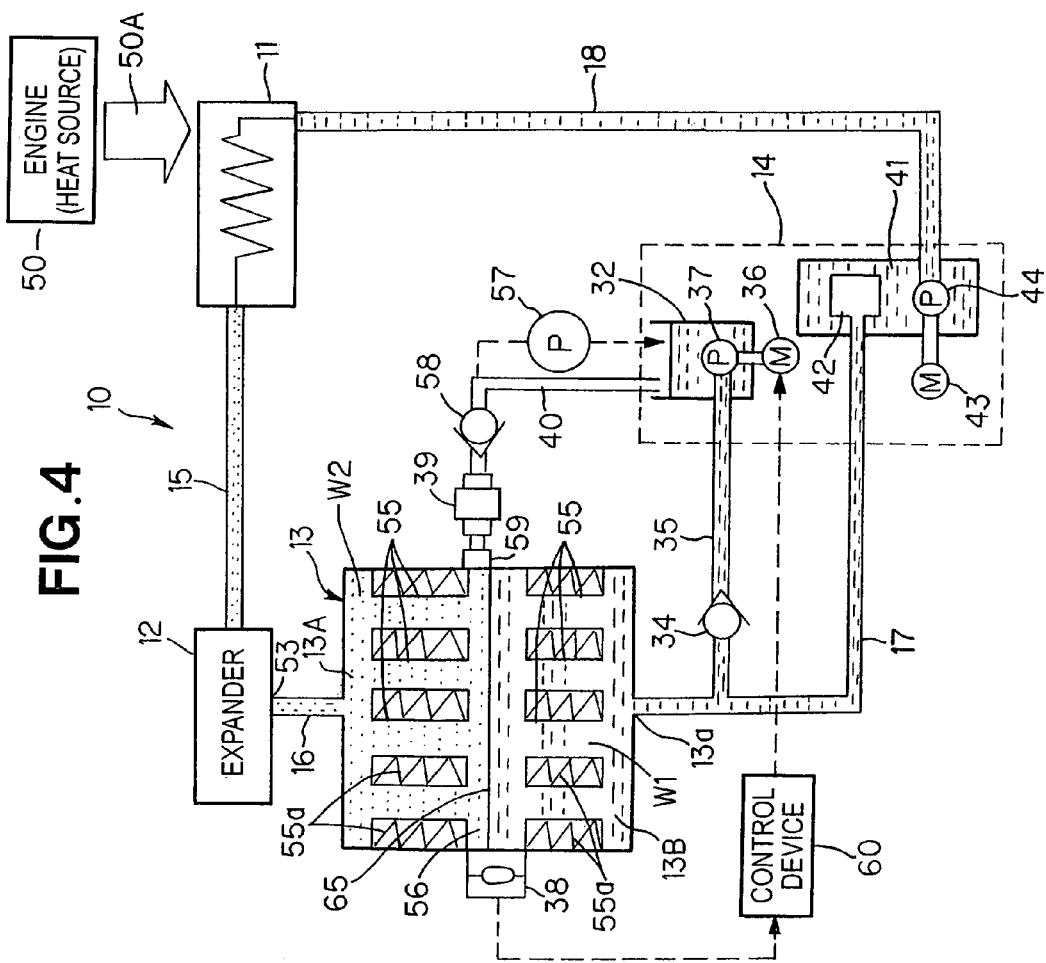
FIG. 4 is a block diagram showing a system setup of the Rankine cycle apparatus, which particularly shows flows of a working medium in the apparatus.
Figure 5:
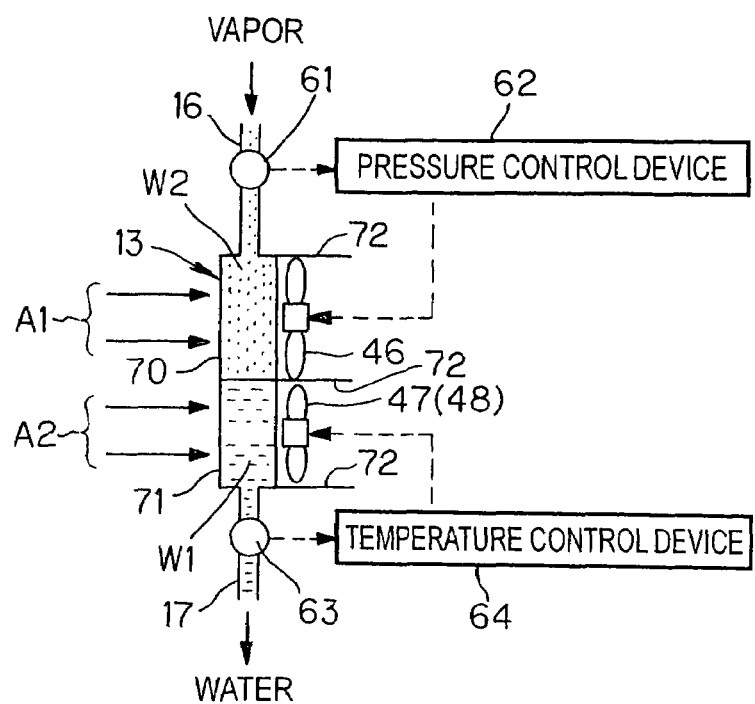
FIG. 5 is a side view showing an inner structure of a condenser and other components peripheral to the condenser in the Rankine cycle apparatus of FIG. 1.
Figure 6:
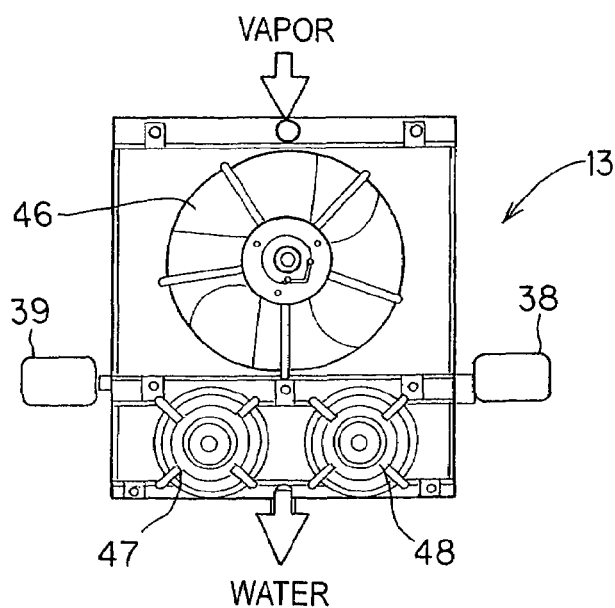
FIG. 6 is a rear view of cooling fans provided behind the condenser.

FIG. 4 shows the system of the Rankine cycle apparatus 10 with a central focus on the condenser 13, which particularly shows a front view of the condenser 13 as taken from before the vehicle; more specifically, states of the working medium (water or condensed water W1 and water vapor W2) within the condenser 13 are illustrated. FIG. 5 is a side view of the cooling device condenser 13, which shows positional relationship among cooling fans 46, 47 and 48 provided for the condenser 13 as well as inner states of the condenser 13. FIG. 6 is a rear view of cooling fans 46 to 48 provided behind the condenser 13.

The condenser 13 includes a vapor introducing chamber 13A in its upper end portion, a water collecting chamber 13B in its lower end portion, and an intermediate chamber 56. A plurality of cooling pipes 55 are provided between the vapor introducing chamber 13A and the intermediate chamber 56 and between the intermediate chamber 56 and the water collecting chamber 13B, and these three chambers 13A, 13B and 56 are in fluid communication with each other. Cooling fins 55a are provided on the outer periphery of the cooling pipes 55.

The vapor introducing chamber 13A of the condenser 13 is connected via the pipe 16 to the vapor outlet port 53 of the expander 12, and the water collecting chamber 13B is connected via the pipe 17 to the water supplying pump unit 14. As noted earlier, the expander 12 is connected via the pipe 15 to the evaporator 11, and the water supplying pump unit 14 is connected via the pipe 18 to the evaporator 11.

The evaporator 11 receives heat 50A from the exhaust gas of the engine (heat source) 50 via the exhaust pipe 45 (see FIG. 1). Within the water supplying pump unit 14, there are included various components, such as the sealed tank 41, water coalescer 42, high-pressure water supplying pump 44, drive motor 43, open tank 32, return pump 37 and motor 36.

In the condenser 13, water vapor W2 is cooled and condensed to turn to water (condensed water) W1 and accumulated in a lower inner portion of the condenser 13. Horizontal line drawn in the figure within the intermediate chamber 56 represents a liquid level 65 (corresponding to the liquid level position P1 of FIG. 1) that indicates a liquid level position of the water W1 accumulated in the condenser 13.

The liquid level sensor 38 and intermediate discharge port 59 are provided at a position corresponding to the position of the liquid level 65. The liquid level sensor 38 outputs a detection signal, representative of the liquid level position detected thereby, to a control device 60. The control device 60 generates a motor control instruction signal on the basis of the liquid level position detection signal from the sensor 38 and sends the motor control instruction signal to the motor 36 of the return pump 37.

The air vent 39 for water vapor is coupled to the intermediate discharge port 59, and it has an output end communicating with the open tank 32 via the pipe 40 equipped with a check valve 58. Exhaust pump 57 is annexed to the pipe 40 in parallel relation thereto.

Further, as seen in FIGS. 5 and 6, the cooling fan 46 is disposed adjacent the rear surface (right side surface in the figure) of the condenser 13 in corresponding relation to a gaseous-phase portion or vapor condensing portion 70 of the condenser 13 where the vapor W2 is accumulated, and the cooling fans 47 and 48 are disposed adjacent the rear surface of the condenser 13 in corresponding relation to a liquid-phase portion or condensed water cooling portion 71 of the condenser where the water W1 is accumulated.

The cooling operation by the cooling fan 46 is controlled by a pressure control device 62 on the basis of a vapor pressure detection signal output by a pressure sensor 61 mounted, for example, on the pipe 16 through which the vapor W2 flows. Namely, the cooling fan 46 is a vapor-condensing cooling fan to be used for vapor pressure adjustment. Further, the cooling operations by the cooling fans 47 and 48 are controlled by a temperature control device 64 on the basis of a water temperature detection signal output by a temperature sensor 63 mounted, for example, on the pipe 17 through which the water W1 flows. Namely, the cooling fans 47 and 48 are water-cooling fans to be used for cooling of the condensed water.

In FIG. 5, A1 indicates a flow of cooling air applied from before the gaseous-phase portion 70 of the condenser 13 on the basis of the rotation of the cooling fan 46, while A2 indicates a flow of cooling air applied from before the liquid-phase portion 71 of the condenser 13 on the basis of the rotation of the cooling fans 47 and 48.

As apparent from the foregoing, the gaseous-phase portion or vapor condensing portion 70 and the liquid-phase portion or condensed water cooling portion 71 in the condenser 13 are cooled independently of each other. Reference numeral 72 represents shrouds that zone or define the individual cooling regions.

Details about pressure control for the gaseous-phase portion and temperature control for the liquid-phase portion will be discussed later.

Referring back to FIG. 4, the water vapor discharged from the vapor outlet port 53 of the expander 12 is substantially equivalent in pressure to the atmospheric pressure. In the intermediate chamber 56 into which the respective outlets of the upper cooling pipes (condensing pipes) 55 open, water is discharged via the air vent 39 in order to adjust the liquid level 65 to lie within the intermediate chamber 56. Further, the high-pressure water supplying pump 44 functions, as a water supplying pump of a main circulation circuit in the Rankine cycle apparatus 10, to supply a necessary amount of water to the evaporator 11.

The reserving open tank 32, which is open to the atmosphere, retains reserve water for the sealed circulation circuitry in the system. The return pump 37 supplies water into the condenser 13 in response to the detection signal from the liquid level sensor 38. The exhaust pump 57 sucks in air from the downstream end of the air vent 39 when the condenser 13 is to be operated at a negative pressure.

The above-mentioned exhaust pump 57 may be constructed to operate in response to detection of a negative pressure by the pressure sensor 61 and pressure control device 62 shown in FIG. 5, or by the control device 60 detecting via the liquid level sensor 38 when the position of the liquid level 65 rises above a predetermined upper limit.

The check valve 58 prevents a reverse flow of the atmospheric air when the interior pressure of the condenser 13 turns to a negative pressure, and the check valve 34 prevents a reverse flow of water from the condenser 13 to the return pump 37. The air vent 39 is constructed to allow water and air to pass therethrough, but prevent water vapor from passing therethrough. The intermediate discharge port 59 functions to limit variation in the position of the liquid level 65 of the condensed water, through emission of non-condensing gas or overflow of the water, so that the liquid level position varies only within a predetermined vertical range.

The liquid sensor 38 outputs a position detection signal, representative of an actual current position of the liquid level 65, to the control device 60, and the control device 60 controls the return pump 37 so that the position of the liquid level 65 constantly lies within the intermediate chamber 56. More specifically, the position of the liquid level 65 is controlled to lie within a predetermined vertical range between the air vent 39 and the liquid level sensor 38. The liquid level sensor 38 may be, for example, in the form of a capacitance-type level sensor or float-type level switch.

In FIG. 5, the pressure sensor 61 detects an interior pressure of the condenser 13; basically, it detects a pressure of the water vapor W2. The pressure control device 62 operates the cooling fan 46 in such a manner that the interior pressure of the condenser 13 equals a predetermined pressure setting. The temperature sensor 63 detects a current temperature of the condensed water W1. The temperature control device 64 operates the cooling fans 47 and 48 in such a manner that the condensed water temperature equals a predetermined temperature setting.

Figure 7:
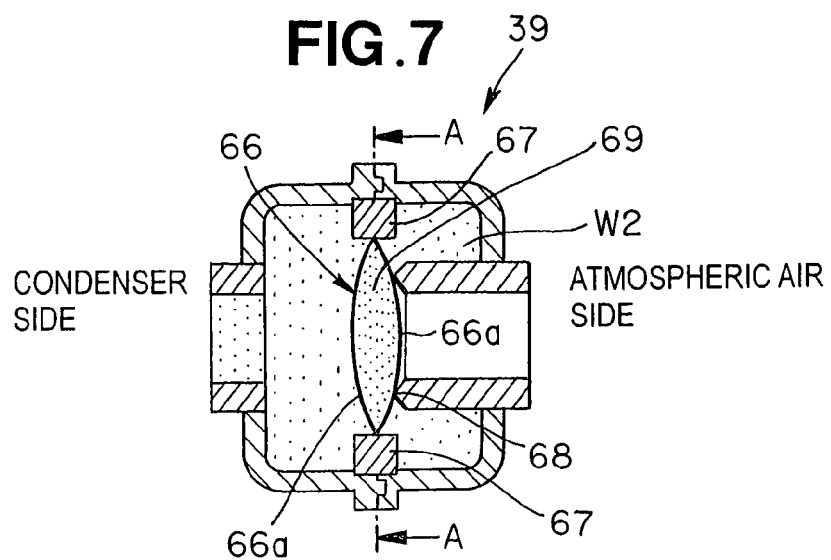
FIG. 7 is a sectional view showing a structure of an air vent in its closed position.
Figure 8:
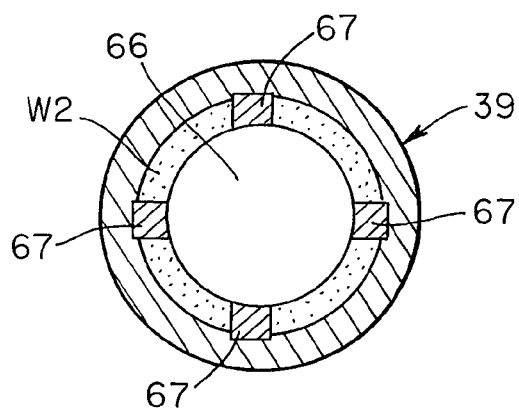
FIG. 8 is a sectional view of the air vent taken along the A—A lines of FIG. 7.
Figure 9:
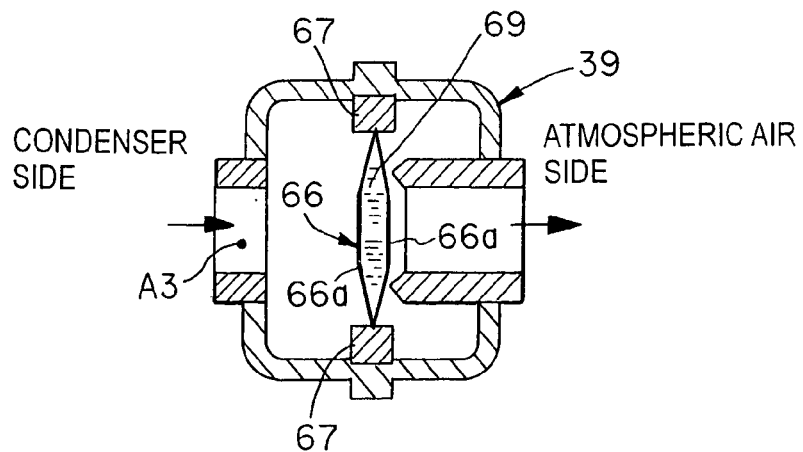
FIG. 9 is a sectional view of the air vent in an opened position.

Next, construction and behavior of the air vent 39 employed in the instant embodiment will be detailed with reference to FIGS. 7 to 9. FIG. 7 is a vertical sectional view of the air vent 39 and FIG. 8 is a sectional view of the air vent 39 taken along the A—A lines of FIG. 7, both of which show the air vent 39 in a closed position. FIG. 9 is a vertical sectional view of the air vent 39 in an opened position. In these figures, the left side of the air vent 39 is a side communicating with the condenser 13 (i.e., "condenser side"), while the right side of the air vent 39 is a side communicating with the atmosphere (i.e., "atmosphere side"). The air vent 39 is hermetically sealed when its interior is filled with saturated vapor (FIG. 7), automatically opened when water or non-condensing gas is present in the interior, and again hermetically sealed by discharging the water or non-condensing gas (FIG. 8).

In FIG. 7, the air vent 39 includes a valve 66 located generally centrally therein, a valve support 67 supporting the valve 66, and a valve port (packing) 68.

The valve 66 supported by the valve support 67 is positioned to close up the valve port 68 when necessary. The valve 66 comprises a pair of opposed diaphragms 66a combined to form a hermetically-sealed space therebetween, and temperature-sensitive liquid 69 is held in the sealed space. The temperature-sensitive liquid 69 has characteristics such that, like water, it is kept in the liquid phase under less than a predetermined pressure or temperature but expands as a gas once the temperature exceeds a predetermined level.

FIG. 10 shows respective saturation curves C1 and C2 of the temperature-sensitive liquid 69 and water. The temperature at which the temperature-sensitive liquid 69 turns to the gaseous state is lower by $\Delta T$ (about 10° C.) than the temperature at which water turns to water vapor. Thus, when the interior of the air vent 39 is filled with the water vapor W2, the temperature-sensitive liquid 69 is kept in the gaseous state, so that the sealed space containing the expanded temperature-sensitive liquid 69 presses the opposed diaphragms 66a outwardly away from each other so as to close up a gap between the valve port 68 and the valve 66 comprised of the diaphragms 66a (see FIG. 7). Conversely, when the interior of the air vent 39 is at a low temperature (e.g., when non-condensing gas A3, such as air, is present in the ambient environment around the valve 66), the temperature-sensitive liquid 69 is kept in the liquid state, the opposed diaphragms 66a are pressed inwardly toward each other, so that air etc. is discharged through the gap between the valve 66 and the valve port 68 (see FIG. 9).

As apparent from the foregoing, the control device 60 shown in FIG. 4 is constructed to control the position of the liquid level 65 to vary only within the predetermined vertical range (variation width) in the condenser 13 that cools the water vapor W2 via the cooling fan 46 to convert the vapor W2 back to the water (condensed water) W1. When the detection signal output from the liquid level sensor 38, which detects a current position of the liquid level 65 that corresponds to the boundary between the gaseous-phase portion 70 and the liquid-phase portion 71 (see FIG. 5) in the condenser 13, indicates that the position of the liquid level 65 is lower than the lower limit of the predetermined range, the control device 60 controls the motor 36 of the return pump 37 that supplies water into the condenser 13, to thereby re-supply or replenish a deficient amount of water from the open tank 32 via the pipe 35 to the condenser 13.

Further, when the position of the liquid level 65 is higher than the upper limit of the predetermined range, the control device 60 discharges an excessive water to the open tank 32 via the intermediate discharge port 59, air vent 39, etc. In this way, a desirable range of the position of the liquid level 65 can be set in accordance with the range determined by the lower limit based on the detection by the liquid level sensor 38 and the upper limit based on the operation of the air vent 39.

The intermediate discharge port 59 for discharging the water (condensed water) W1 is provided in the intermediate chamber 56 of the condenser 13, in order to control the position of the liquid level 65. When the liquid level 65 is higher than the intermediate discharge port 59, the intermediate discharge port 59 causes the water to flow out therethrough to the reserving open tank 32 so that the liquid level 65 can be lowered. When the liquid level 65 is lower than the intermediate discharge port 59, the air vent 39 coupled to the intermediate discharge port 59 prevents the vapor from escaping via the water outlet 59.

As seen in FIGS. 7–9, the air vent 39 for preventing the vapor from escaping via the intermediate discharge port 59 automatically closes the valve when vapor is present in its interior, but automatically opens the valve when air (non-condensing gas) or water is present.

Further, as seen in FIG. 4, the liquid level sensor 38 is provided at a position lower than the intermediate discharge port 59, and, when the position of the liquid level 65 has lowered below the liquid level sensor 38, a deficient amount of water is re-supplied or replenished from the open tank 32 by means of the return pump 37, so as to raise the liquid level 65 to the position of the liquid level sensor 38.

As set forth above, the position of the liquid level 65 is constantly kept within the vertical range between the intermediate discharge port 59 and the liquid level sensor 38. If the interval is distance between the intermediate discharge port 59 and the liquid level sensor 38 is increased, an error in heat transmission area between the vapor portion W2 and the water (condensed water) portion W1 will become greater. Conversely, if the interval between the intermediate discharge port 59 and the liquid level sensor 38 is decreased, the return pump 37 and air vent 39 have to operate very often. Therefore, it is preferable that the interval between the intermediate discharge port 59 and the liquid level sensor 38 be set within a moderate range such that both of the above two adverse influences or inconveniences can be lessened to an appropriate degree. Further, in order to keep constant the heat transmission areas, it is desirable that the interval between the intermediate discharge port 59 and the liquid level sensor 38 be as small as possible or zero.

FIG. 11A shows positional relationship among the liquid level sensor 38, the air vent 39 and the liquid level 65 in the Rankine cycle apparatus, and FIG. 11B shows relationship among the liquid level 65 and operational states of the air vent 39 and return pump 37.

In FIG. 11A, $H_A$, $H_B$ and $H_L$ represent the upper-limit position of the liquid level, lower-limit liquid level and position of the liquid level 65, respectively. When the actual position $H_L$ of the liquid level 65 is higher than the upper-limit position $H_A$, the air vent 39 is set in its opened position, and the return pump 37 (see FIG. 4) is set in its OFF state. When the position $H_L$ of the liquid level 65 is between the upper-limit and lower-limit positions $H_A$ and $H_B$ of the liquid level, the air vent 39 is set in its closed position, and the return pump 37 (see FIG. 4) is set in its OFF state. When the position $H_L$ of the liquid level 65 is lower than the lower-limit positions $H_B$, the air vent 39 is set in its closed position, and the return pump 37 (see FIG. 4) is set in its ON state. In this way, variation in the liquid level 65 can be reliably confined within the range between the upper-limit and lower-limit positions $H_A$ and $H_B$.

Also, even when the inflow amount (mass flow rate) of water vapor or the amount of water discharge (mass flow rate) to the high-pressure water supplying pump 44 varies at the time of activation/deactivation or transient variation of the Rankine cycle apparatus 10, the described arrangements of the instant embodiment can effectively restrict or control variation of the position of the liquid level 65 within the condenser 13 and thereby permits stable operation of the condenser 13.

Further, as illustrated in FIG. 4, the Rankine cycle apparatus 10 includes the reserving open tank 32 open to the atmosphere and provided separately from the main circulation circuit. This open tank 32 is connected to the condenser 13, via the air vent 39 coupled to the intermediate discharge port 59 and the check valve 58. Lower portion of the open tank 32 is connected to the outlet port 13a of the condenser 13 via the return pump 37, pipe 35 and check valve 34.

When the liquid level 65 is higher in position than the intermediate discharge port 59, the water overflows out of the condenser 13 to be directed into the open tank 32, while, when the liquid level 65 is lower in position than the liquid level sensor 38, the return pump 37 is activated to replenish water to the condenser 13. Because the amount of water supply by the high-pressure water supplying pump 44, located downstream of the condenser 13, is controlled in the instant embodiment, the activation of the return pump 37 causes the liquid level 65 to rise up to the position of the liquid level sensor 38 due to the water supply into the condenser 13, upon which the return pump 37 is deactivated.

Further, because the intermediate chamber 56, into which the plurality of cooling pipes (condensing pipes) 55 open, is provided in the region including the intermediate discharge port 59 and liquid sensor 38, the liquid level 65 is allowed to vary with improved response and in a stabilized manner during water discharge from the intermediate discharge port 59 or water supply from the return pump 37.

Note that the provision of the intermediate chamber 56 is not necessarily essential to the present invention if the vapor introducing chamber 13A and water collecting chamber 13B are in fluid communication with each other via the plurality of cooling pipes (condensing pipes) 55.

Figure 12:
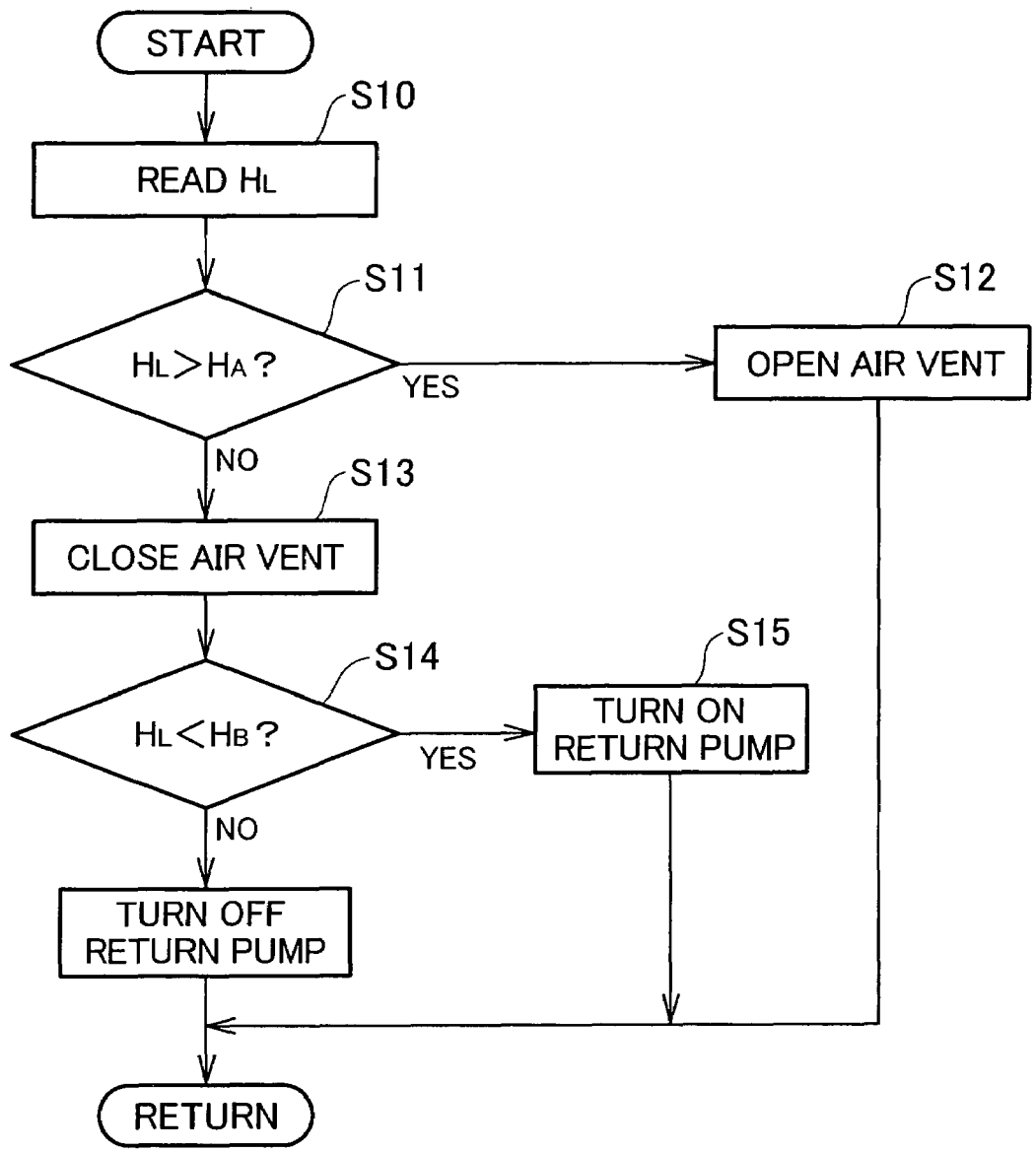
FIG. 12 is a flow chart showing an operational sequence of liquid level position control.

Operational sequence of the liquid level position control performed by the control device 60 is explained below with reference to a flow chart of the FIG. 12.

At step S10, the control device 60 reads the current position $H_L$ of the liquid level 65 via the liquid level sensor 38.

At step S11, it is determined whether the liquid level position $H_L$ is higher than the upper-limit position $H_A$ of the liquid level, and, if so, control proceeds to step S12, where the air vent 39 is brought to its opened position to discharge the excessive water so as to lower the liquid level 65. After that, the control device 60 reverts to step S10. When the liquid level position $H_L$ is lower than the upper-limit position $H_A$ of the liquid level, control proceeds to step S13 in order to close the air vent 39.

At step S14, it is determined whether the liquid level position $H_L$ is lower than the lower-limit position $H_B$ of the liquid level, and, if so, control proceeds to step S15, where the return pump 37 is turned on for re-supply or replenishment of deficient water. Further, if the liquid level position $H_L$ is higher than the lower-limit position $H_B$ of the liquid level, the return pump 37 is turned off to not replenish water. After that, the control device 60 reverts to step S10.

Figure 13:
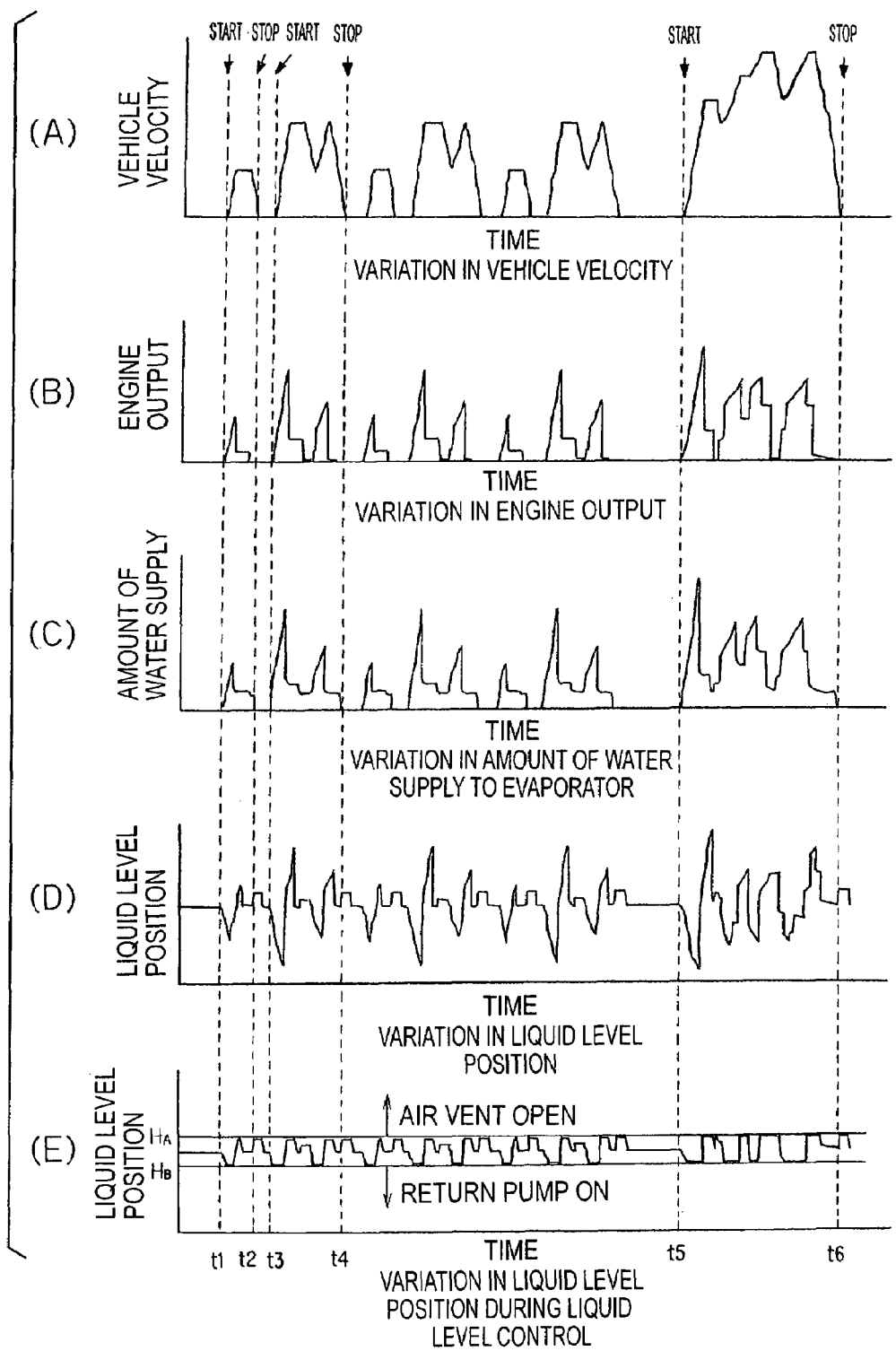
FIG. 13 is a timing chart showing variation in a traveling velocity of the vehicle having the Rankine cycle apparatus mounted thereon, variation in an engine output, variation in an amount of water supply to an evaporator and variation in the liquid level position within the condenser.

FIG. 13 is a timing chart showing variation in the velocity of the vehicle having the Rankine cycle apparatus 10 mounted thereon, variation in the engine output, variation in the amount of water supply to the evaporator and variation in the liquid level position within the condenser, in contradistinction to the conventional apparatus. More specifically, section (A) of FIG. 13 shows variation in the traveling velocity of the vehicle, (B) variation in the engine output of the vehicle, (C) variation in the amount of water supply to the evaporator in the conventional apparatus, (D) variation in the liquid level position within the condenser in the conventional apparatus, and (E) variation in the liquid level position within the condenser in the embodiment of the present invention.

As the velocity of the vehicle, having the Rankine cycle apparatus mounted thereon, varies as illustrated in (A) of FIG. 13, the engine output of the vehicle varies as illustrated in (B) of FIG. 13, in response to which the amount of water supply to the evaporator varies in a manner as illustrated in (C) of FIG. 13 and also the liquid level position within the condenser varies in a manner as illustrated in (D) of FIG. 13. In other words, as the vehicle starts traveling at time points t1, t3 and t5 and stops traveling at time points t2, t4 and t6 along the time axis, the engine output varies and the amount of water supply to the evaporator also varies, so that the liquid level position within the condenser varies.

Figure 18:
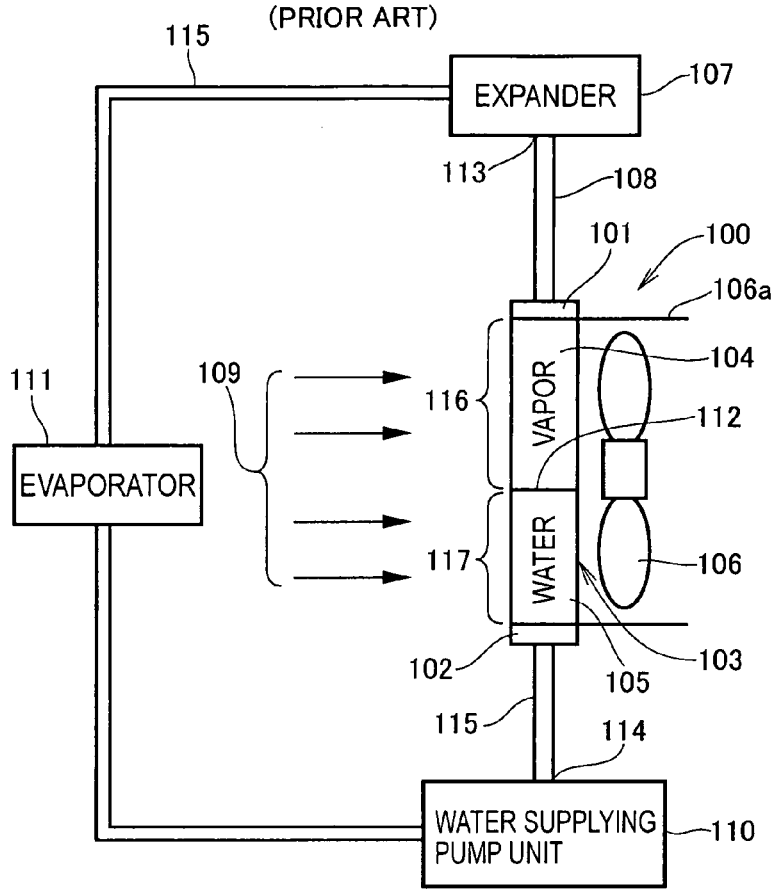
FIG. 18 is a schematic block diagram of a general setup of a conventionally-known vehicle-mounted Rankine cycle apparatus.
Figure 19:
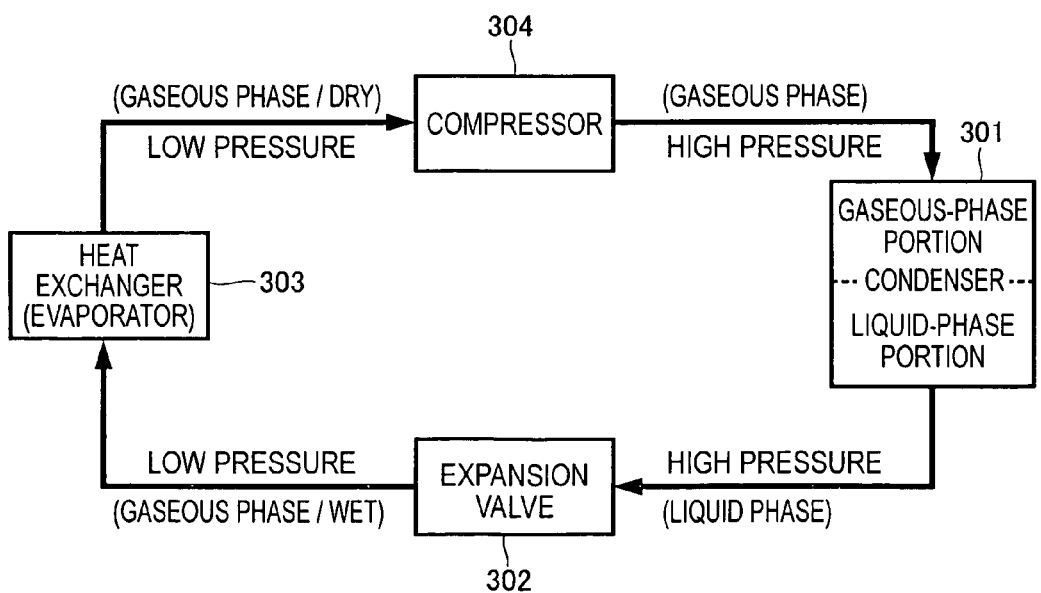
FIG. 19 is a schematic view of a conventional freezing machine.

With the condenser 100 of the conventional vehicle-mounted Rankine cycle apparatus shown in FIG. 18, the amount of water supply to the evaporator 111 varies because the engine output varies as illustrated in (B) of FIG. 13 in response to the start/stop of the vehicle and transitional vehicle velocity variation as illustrated in (A) of FIG. 13, so that the liquid level position 112 in the cooling pipes 103 of the condenser 100 would vary. Namely, in the condenser 100, the liquid level position 112 rises when the inflow amount of vapor is greater than the discharge amount of condensed water, but falls when the inflow amount of vapor is smaller than the discharge amount of condensed water.

By contrast, according to the instant embodiment, the above-described liquid level position control is performed when the vehicle varies in traveling velocity as illustrated in (A) of FIG. 13, and thus, the liquid level position can be controlled to vary between the upper-limit and lower-limit positions $H_A$ and $H_B$ at the time of a start/stop of traveling of the vehicle. As a consequence, the instant embodiment can reliably prevent great variation in the liquid level position within the condenser 13.

In the present invention, as set forth above, the positional variation in the liquid level 65 of the water (condensed water) W1 accumulated in the condenser 13 is confined to the predetermined range, so that respective variation of the heat transmission areas of the gaseous-phase portion and liquid-phase portion, corresponding to vapor and condensed water, in the condenser 13 can be effectively reduced. As a consequence, the present invention can perform the necessary cooling without regard to variation in the heat transmission areas and achieve an enhanced accuracy of the control. Also, the present invention can reduce cavitations in the pump device and extra heat energy consumption during re-heating in the evaporator 11.

Further, the present invention can keep a variation width of the heat transmission areas within a permissible range and impart a hysteresis to switching between discharge and replenishment of the liquid-phase working medium, to thereby lower the frequency of the switching operation. As a result, the present invention can achieve stabilized operation of the condenser 13 and enhanced durability of devices involved in the discharge and replenishment of the liquid-phase working medium.

Moreover, because the present invention can appropriately control the liquid level by discharging the liquid-phase working medium (water) from within the condenser 13 while preventing discharge of the gaseous-phase working medium (vapor), it can achieve even further stabilized operation of the condenser 13.

Furthermore, the present invention can replenish the liquid-phase working medium directly up to the set liquid level from the reserving open tank, accumulating the liquid-phase working medium, via the return pump, so that the liquid level position can be appropriately adjusted and accurately stabilized promptly through high-response and high-precision supply amount control of the pump.

In addition, the present invention can perform the liquid level position control while keeping the necessary total mass flow rate of the working medium in the circulation circuitry, and thus, the circulation circuitry need not be equipped with particular devices indented for working medium discharge and replenishment to and from the outside.

Furthermore, the present invention can reduce differences in the liquid level position among the cooling pipes of the condenser and thereby accurately stabilize the liquid level promptly during the discharge and replenishment of the liquid-phase working medium, as a result of which the present invention can achieve even further stabilized operation of the condenser 13.

Next, construction and behavior of a cooling device of the condenser 13 will be described.

As illustrated in FIGS. 5 and 6, the cooling device of the condenser 13 includes a first cooling section for cooling the gaseous-phase portion 70 located upstream of the liquid level (gas-liquid interface) 65 within the condenser 13, and a second cooling section for the cooling liquid-phase portion 71 located downstream of the liquid level 65 within the condenser 13. The first cooling section includes the cooling fan 46, and a drive device and control device for the cooling fan 46. The second cooling section includes the cooling fans 47 and 48, and a drive device and control device for the cooling fans 47 and 48. The first and second cooling sections are arranged to operate independently of each other.

The cooling rotation operation of the cooling fan 46 is controlled by the pressure control device 62 on the basis of a vapor pressure within the gaseous-phase portion 70 detected by the pressure sensor 61. Thus controlling the vapor pressure within the gaseous-phase portion 70 can optimally control the cooling efficiency of the gaseous-phase portion 70 in the condenser 13. The cooling operations of the cooling fans 47 and 48 are controlled by the temperature control device 64 on the basis of a condensed water temperature within the liquid-phase portion 71 detected by the temperature sensor 63. Thus controlling the condensed water temperature within the liquid-phase portion 71 can optimally control the cooling efficiency of the liquid-phase portion 71 in the condenser 13. In this manner, the cooling fan 46 and the cooling fans 47 and 48 are controlled independently of each other via the respective control systems.

When the vapor pressure of the gaseous-phase portion 70 is higher than a pressure of the discharged vapor from the expander 12, the vapor W2 would flow upstream (backward) toward the expander 12 (see FIG. 4) and thereby lowers the output from the expander 12. Thus, the pressure control device 62 has to control the cooling efficiency of the cooling fan 46 so as to keep the vapor pressure of the gaseous-phase portion 70 lower than the pressure of the discharged vapor from the expander 12. Further, as the vapor pressure of the gaseous-phase portion 70 decreases, the boiling temperature of the condensed water W1 lowers so that the possibility of cavitations being produced increases. Thus, the pressure control device 62 has to control the cooling efficiency of the cooling fan 46 so as to keep the pressure of the gaseous-phase portion 70 higher than a particular pressure (pump-cavitation producing pressure) that will cause cavitations to be produced in water at a suction port of the high-pressure water supplying pump 44 (see FIG. 4). Namely, the pressure control device 62 performs optimal control to satisfy the above-mentioned two conditions.

For controlling the pressure of the gaseous-phase portion 70 in the condenser 13, there may be employed ON/OFF control based on, for example, a pressure switch having a hysteresis characteristic with an upper-limit pressure (upper-limit pressure setting) $P_A$ and lower-limit pressure (lower-limit pressure setting) $P_B$ set therefor. If, in this case, a difference or interval between the upper-limit pressure setting $P_A$ and lower-limit pressure setting $P_B$ is too great, the pressure control will present a great error, while, if the interval between the upper-limit pressure $P_A$ and lower-limit pressure $P_B$ is too small, the cooling fan 46 will be turned on and off too frequently, which is not preferable in terms of the durability of the component parts. Therefore, it is desirable that the interval between the upper-limit pressure $P_A$ and lower-limit pressure $P_B$ be set within an appropriate range such that both of the above-mentioned two adverse influences can be lessened.

Further, because undesired cavitations are produced if the condensed water temperature rises above the boiling temperature, the temperature control device 64 controls the cooling efficiency of the cooling fans 47 and 48 of the liquid-phase portion 71 so as to keep an optimal high temperature of the condensed water that can effectively minimize a heat energy loss and prevent production of undesired cavitations. Preferably, in the instant embodiment, the temperature control device 64 controls at least a temperature of the discharged liquid-phase working medium near the outlet port of the condenser 13, as the temperature of the liquid-phase portion to be adjusted or controlled. Because, the temperature of the discharged liquid-phase working medium near the outlet port of the condenser most closely represents an actual value of the temperature of the liquid-phase working medium having been just condensed by the cooling section.

For controlling the temperature of the condensed water W1 of the liquid-phase portion 71 in the condenser 13, there may be employed ON/OFF control based on, for example, a temperature switch having a hysteresis characteristic with an upper-limit temperature (upper-limit temperature setting) $T_A$ and lower-limit temperature (lower-limit temperature setting) $T_B$ set therefor. If, in this case, a difference or interval between the upper-limit temperature $T_A$ and lower-limit temperature $T_B$ is too great, the temperature control will present a great error, while, if the interval between the upper-limit temperature $T_A$ and lower-limit temperature $T_B$ is too small, the cooling fans 47 and 48 will be turned on and off too frequently, which is not preferable in terms of the durability of the component parts. Therefore, it is desirable that the interval between the upper-limit temperature $T_A$ and lower-limit temperature $T_B$ be set within an appropriate range such that both of the above-mentioned two adverse influences can be lessened.

Operational sequence of the pressure control performed by the control device 62 on the gaseous-phase portion 70 of the condenser 13 is explained below with reference to a flow chart of the FIG. 14.

At step S21, the control device 62 reads the current pressure Pc of the gaseous-phase portion 70 (i.e., condenser pressure Pc) detected via the pressure sensor 61.

At step S22, it is determined whether the condenser pressure Pc is greater than the upper-limit pressure setting $P_A$, and, if so, control proceeds to step S23. If, on the other hand, the condenser pressure Pc is smaller than the upper-limit pressure $P_A$, control proceeds to step S24.

At step S23, the cooling fan 46 is driven to rotate to cool the gaseous-phase portion 70 (see FIG. 5) and thereby lower the condenser pressure. After that, control reverts to step S21.

At step S24, it is determined whether the condenser pressure Pc is lower than the other or lower-limit pressure setting $P_B$, and, if so, control proceeds to step S25, where the rotation of the cooling fan 46 is terminated to raise the condenser pressure. If, on the other hand, the condenser pressure Pc is not lower than the lower-limit pressure setting $P_B$, control proceeds to step S21.

Figure 14:
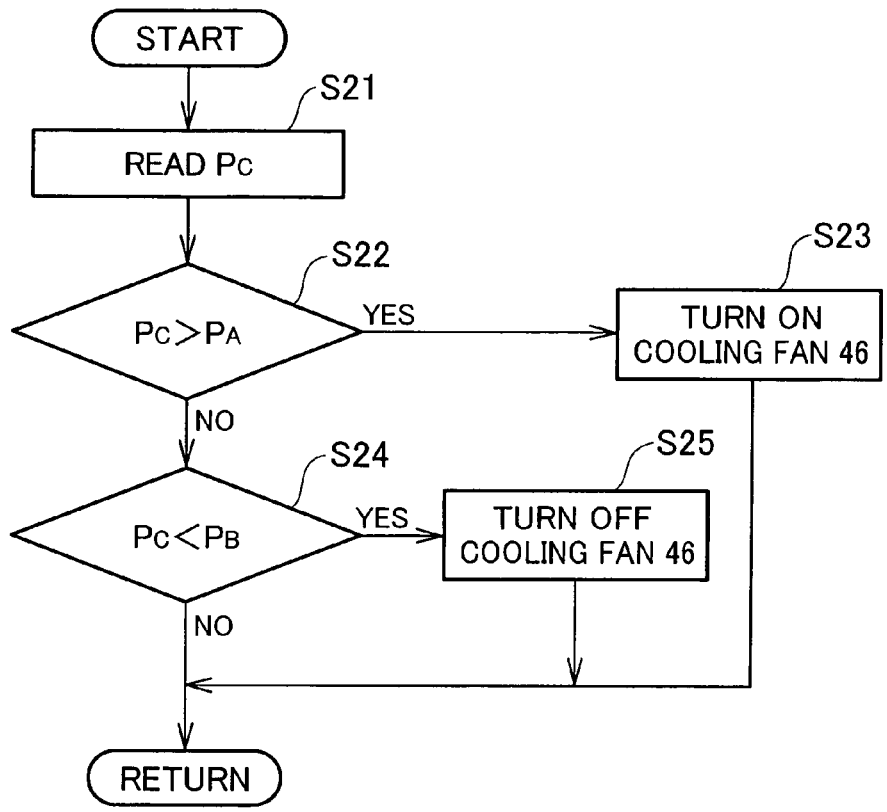
FIG. 14 is a flow chart showing an operational sequence of condenser pressure control.
Figure 15:
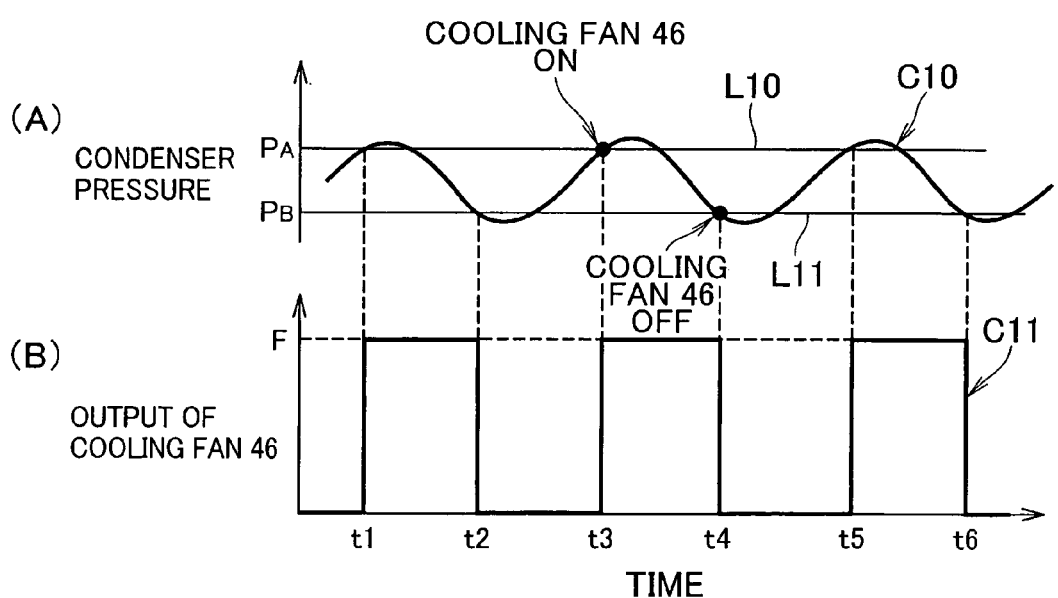
FIG. 15 is an operational characteristic view explanatory of behavior of the condenser based on the condenser pressure control of FIG. 14.

FIG. 15 is an operational characteristic view explanatory of behavior of the condenser 13 based on the pressure control of FIG. 14, where the horizontal axis represents the time while the vertical axis represents the condenser pressure (section (A) of FIG. 15) and output of the cooling fan 46 (section (B) of FIG. 15). In the figure, a straight line L10 represents the upper-limit pressure setting $P_A$, and another straight line L11 represents the lower-limit pressure setting $P_B$. Further, a waveform C10 represents variation in the condenser pressure, and another waveform C11 represents variation in the behavior (output) of the cooling fan 46.

In FIG. 15, each time the condenser pressure reaches the upper-limit pressure setting $P_A$ at time point t1, t3 or t5, the cooling fan 46 produces a high-level output F, and each time the condenser pressure reaches the lower-limit pressure setting $P_B$ at time point t2, t4 or t6, the cooling fan 46 produces a zero-level output. In this way, the cooling operation based on the rotation of the cooling fan 46 is ON/OFF-controlled in such a manner that the condenser pressure falls within the range defined by the upper-limit pressure setting $P_A$ and the lower-limit pressure setting $P_B$.

Operational sequence of the temperature control performed by the control device 64 on the liquid-phase portion 71 of the condenser 13 is explained in detail below with reference to a flow chart of the FIG. 16.

At step S31, the control device 64 reads the current temperature (i.e., condensed water temperature $T_W$) of the liquid-phase portion 71 via the temperature sensor 63 of FIG. 5.

At step S32, it is determined whether or not the condensed water temperature $T_W$ is greater than the upper-limit temperature setting $T_A$, and, if so, control proceeds to step S33. If, on the other hand, the condensed water temperature $T_W$ is smaller than the upper-limit temperature setting $T_A$, control proceeds to step S34.

At step S33, the cooling fans 47 and 48 are driven to rotate to cool the liquid-phase portion 71 and thereby lower the condensed water temperature. After that, control reverts to step S31.

At step S34, it is determined whether or not the condensed water temperature $T_W$ is lower than the other or lower-limit temperature setting $T_B$, and, if so, control proceeds to step S35, where the rotation of the cooling fans 47 and 48 is terminated to raise the condensed water temperature. If, on the other hand, the condensed water temperature $T_W$ is not lower than the lower-limit temperature setting $T_B$, control proceeds to step S31.

Figure 16:
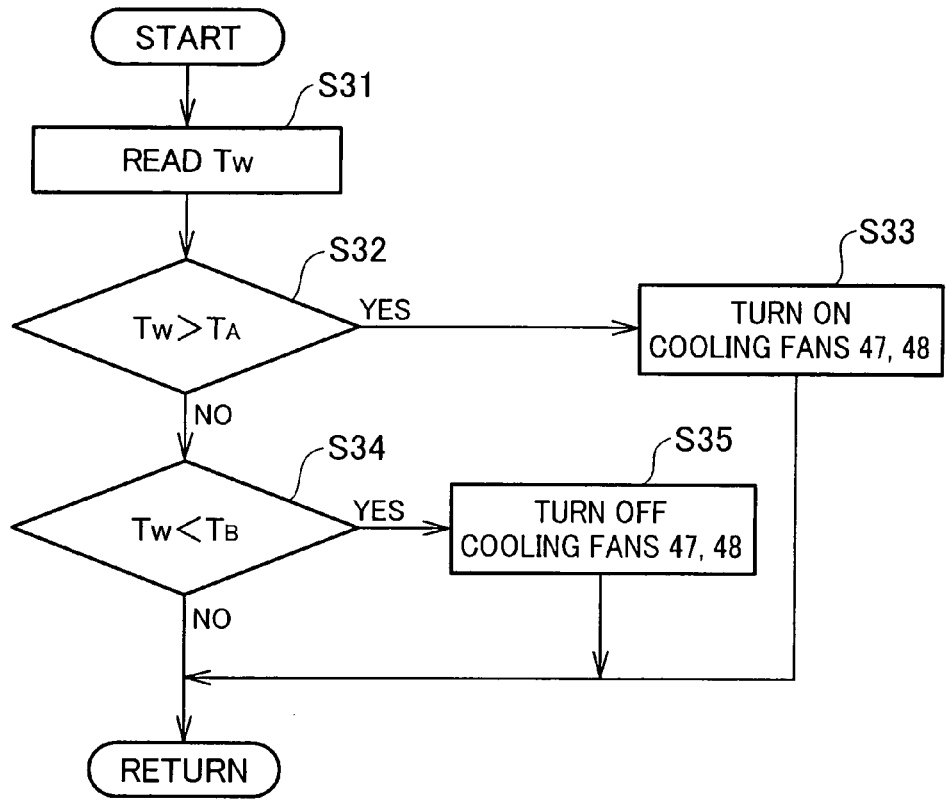
FIG. 16 is a flow chart of showing an operational sequence of condensed water temperature control.
Figure 17:
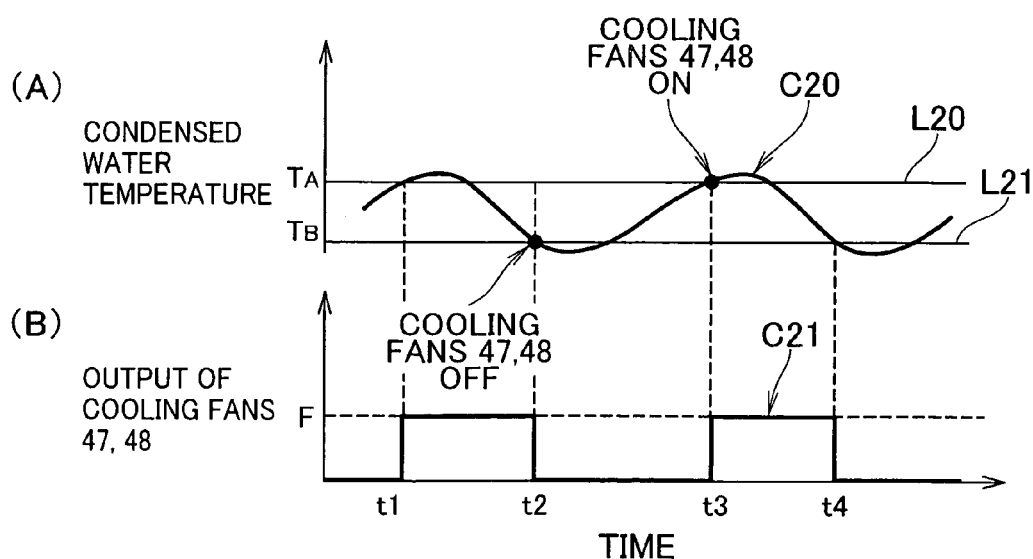
FIG. 17 is an operational characteristic view explanatory of behavior of the condenser based on the condenser temperature control of FIG. 16.

FIG. 17 is an operational characteristic view explanatory of behavior of the condenser 13 based on the temperature control of FIG. 16, where the horizontal axis represents the time while the vertical axis represents the condensed water temperature (section (A)) and output of the cooling fans 47 and 48 (section (B)). In the figure, a straight line L20 represents the upper-limit temperature (upper-limit temperature setting) $T_A$, and another straight line L21 represents the lower-limit temperature (lower-limit temperature setting) $T_B$. Further, a waveform C20 represents variation in the condensed water temperature, and another waveform C21 represents variation in the behavior (output) of the cooling fans 47 and 48.

In FIG. 17, each time the condensed water temperature reaches the upper-limit temperature setting $T_A$ at time point t1 or t3, the cooling fans 47 and 48 produce a high-level output F, and each time the condensed water temperature reaches the lower-limit temperature setting $T_B$ at time point t2 or t4, the cooling fans 47 and 48 produce a zero-level output. In this way, the cooling operation based on the rotation of the cooling fans 47 and 48 is ON/OFF-controlled in such a manner that the condenser water temperature falls within the range defined by the upper-limit temperature setting $T_A$ and the lower-limit temperature setting $T_B$.

In the instant embodiment, as described above, the gaseous-phase portion 70 and liquid-phase portion 71 of the condenser 13 are cooled independently of each other via the respective cooling fans 46 and 47, 48. Namely, the gaseous-phase portion 70 of the condenser 13 is cooled in accordance with the detected gaseous-phase pressure in the condenser 13. In this way, the instant embodiment can prevent a decline in the output of the expander 12 (see FIG. 4) to allow the expander 12 to keep operating with a high efficiency. Thus, the described embodiment can reliably prevent the pump cavitations, can reduce the heat energy loss, and permits stabilized operation of the pump. Also, the liquid-phase portion 71 is cooled in accordance with the detected condensed water temperature in the condenser 13. In this way, the instant embodiment can also prevent the pump cavitations, can reduce the heat energy loss, and permits stabilized operation of the pump.

Whereas the embodiment has been described in relation to the condenser of the Rankine cycle apparatus, the basic principles of the invention can of course be applied to the condenser of freezing machines so that the pressure control of the gaseous-phase portion and the temperature control of the liquid-phase portion can be optimally performed independently of each other.

As having been set forth so far, the present invention can be advantageously employed as an apparatus for controlling a pressure and temperature of a condenser in vehicle-mounted Rankine cycle apparatus, etc.

Obviously, various minor changes and modifications of the present invention are possible in the light of the above teaching. It is therefore to be understood that within the scope of the appended claims the invention may be practiced otherwise than as specifically described.

What is claimed is:

1. A cooling control device for a condenser comprising:
   said condenser for converting a gaseous-phase working medium, discharged from an expander, back to a liquid-phase working medium;
   a supply pump for supplying the liquid-phase working medium, discharged from said condenser, to an evaporator in a pressurized condition;
   first cooling means for cooling a gaseous-phase portion of said condenser;
   second cooling means for cooling a liquid-phase portion of said condenser;
   pressure control means for adjusting a pressure within the gaseous-phase portion by driving said first cooling means in accordance with a detected pressure within the gaseous-phase portion;
   temperature control means for adjusting a temperature within the liquid-phase portion by driving said second cooling means in accordance with a detected temperature within the liquid-phase portion; and
   said first and second cooling means being independently responsive to said pressure control means and said temperature control means, respectively.

2. A cooling control device as claimed in claim 1 wherein said pressure control means controls said first cooling means so that the pressure of the gaseous-phase portion is kept lower than the pressure of the gaseous-phase working medium discharged from the expander.

3. A cooling control device as claimed in claim 1 wherein said pressure control means controls said first cooling means so that the pressure of the gaseous-phase portion is kept higher than a pump-cavitation producing pressure of the liquid-phase working medium.

4. A cooling control device as claimed in claim 1 wherein said temperature control means controls said second cooling means so that the temperature of the liquid-phase portion is kept lower than a pump-cavitation producing temperature of the liquid-phase working medium.

5. A cooling control device as claimed in claim 1 wherein said temperature control means controls at least the temperature of a discharged liquid-phase working medium near an outlet port of said condenser, as the temperature of the liquid-phase portion to be adjusted.

6. A cooling control device for a condenser in a Rankine cycle apparatus comprising:
   an evaporator for heating a liquid-phase working medium to produce a gaseous-phase working medium;
   an expander for converting heat energy of the gaseous-phase working medium, discharged from said evaporator, into mechanical energy;
   said condenser for cooling the gaseous-phase working medium, discharged from said expander, to convert the gaseous-phase working medium back to the liquid-phase working medium;
   a supply pump for supplying the liquid-phase working medium, discharged from said condenser, to said evaporator in a pressurized condition;
   first cooling means for cooling a gaseous-phase portion of said condenser;
   second cooling means for cooling a liquid-phase portion of said condenser, said second cooling means being operable independently of said first cooling means;
   pressure control means for adjusting a cooling efficiency of the gaseous-phase portion by driving said first cooling means in accordance with a detected pressure of the gaseous-phase portion, to thereby adjust the pressure within the gaseous-phase portion;
   temperature control means for adjusting a cooling efficiency of the liquid-phase portion by driving said second cooling means in accordance with a detected temperature of the liquid-phase portion, to thereby adjust the pressure within the liquid-phase portion; and
   said first and second cooling means being independently responsive to said pressure control means and said temperature control means, respectively.

7. A cooling control device as claimed in claim 6 wherein said pressure control means controls said first cooling means so that the pressure of the gaseous-phase portion is kept lower than the pressure of the gaseous-phase working medium discharged from the expander.

8. A cooling control device as claimed in claim 6 wherein said pressure control means controls said first cooling means so that the pressure of the gaseous-phase portion is kept higher than a pump-cavitation producing pressure of the liquid-phase working medium.

9. A cooling control device as claimed in claim 6 wherein said temperature control means controls said second cooling means so that the temperature of the liquid-phase portion is kept lower than a pump-cavitation producing temperature of the liquid-phase working medium.

10. A cooling control device as claimed in claim 6 wherein said temperature control means controls at least the temperature of a discharged liquid-phase working medium near the outlet port of said condenser, as the temperature of the liquid-phase portion to be adjusted.

11. A control device for a cooling device for cooling a condenser that converts a gaseous-phase working medium back to a liquid-phase working medium, said control device comprising:

first cooling means for cooling a gaseous-phase portion of said condenser;

second cooling means for cooling a liquid-phase portion of said condenser;

pressure control means for adjusting a pressure within the gaseous-phase portion by driving said first cooling means in accordance with a detected pressure of the gaseous-phase portion;

temperature control means for adjusting a temperature within the liquid-phase portion by driving said second cooling means in accordance with a detected temperature of the liquid-phase portion; and said first and second cooling means being independently responsive to said pressure control means and said temperature control means, respectively.

12. A control device as claimed in claim 11 wherein an expander for converting heat energy into mechanical energy is provided upstream of said condenser, and a supply pump is provided downstream of said condenser for supplying the liquid-phase working medium, discharged from said condenser, to a succeeding stage in a pressurized condition.

13. A control device as claimed in claim 11 wherein a compressor for discharging the gaseous-phase working medium is provided upstream of said condenser, and an expansion valve for converting the liquid-phase working medium, discharged from said condenser, to the gaseous-phase working medium is provided downstream of said condenser.

14. A control device as claimed in claim 11 wherein said pressure control means controls said first cooling means so that the pressure of the gaseous-phase portion is kept lower than the pressure of the gaseous-phase working medium supplied from upstream of the gaseous-phase portion.

15. A control device as claimed in claim 11 wherein said pressure control means controls said first cooling means so that the pressure of the gaseous-phase portion is kept higher than a pump-cavitation producing pressure of the liquid-phase working medium present downstream of the gaseous-phase portion.

16. A control device as claimed in claim 11 wherein said temperature control means controls said second cooling means so that the temperature of the liquid-phase portion is kept lower than a pump-cavitation producing temperature of the liquid-phase working medium downstream of the liquid-phase portion.

17. A control device as claimed in claim 11 wherein said temperature control means controls at least the temperature of a discharged liquid-phase working medium near the outlet port of said condenser, as the temperature of the liquid-phase portion to be adjusted.

* * * * *